(12) United States Patent
Tokoro

(10) Patent No.: US 8,321,384 B2
(45) Date of Patent: Nov. 27, 2012

(54) STORAGE DEVICE, AND PROGRAM AND METHOD FOR CONTROLLING STORAGE DEVICE

(75) Inventor: Hirotomo Tokoro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 89 days.

(21) Appl. No.: 13/036,164

(22) Filed: Feb. 28, 2011

(65) Prior Publication Data

US 2011/0225130 A1      Sep. 15, 2011

(30) Foreign Application Priority Data

Mar. 12, 2010   (JP) .................................. 2010-56465

(51) Int. Cl.
   *G06F 17/30*   (2006.01)
(52) U.S. Cl. ....................................... 707/692; 707/641
(58) Field of Classification Search ................. 707/641, 707/692
   See application file for complete search history.

(56) References Cited

U.S. PATENT DOCUMENTS

| 7,814,149 B1 * | 10/2010 | Stringham ..................... 709/203 |
| 7,818,495 B2 * | 10/2010 | Tanaka et al. ................. 711/103 |
| 2009/0019246 A1 | 1/2009 | Murase |
| 2009/0083610 A1 | 3/2009 | Arai et al. |
| 2010/0088296 A1 * | 4/2010 | Periyagaram et al. ........ 707/705 |
| 2010/0250501 A1 * | 9/2010 | Mandagere et al. .......... 707/692 |
| 2011/0016095 A1 * | 1/2011 | Anglin et al. ................ 707/692 |

FOREIGN PATENT DOCUMENTS

| JP | 2009-20858 | 1/2009 |
| JP | 2009-020858 | 1/2009 |
| JP | 2009-80696 | 4/2009 |

OTHER PUBLICATIONS

Patent Abstracts of Japan, Publication No. 2009-020858, Published Jan. 29, 2009.
Patent Abstracts of Japan, Publication No. 2009-080696*, Published Apr. 16, 2009.
Patent Abstracts of Japan, Publication No. 2009-020858*, Published Jan. 29, 2009.

* cited by examiner

*Primary Examiner* — Cheryl Lewis
(74) *Attorney, Agent, or Firm* — Staas & Halsey LLP

(57) ABSTRACT

In a storage device, an information acquisition unit acquires and stores information in an information memory unit. A data acquisition unit acquires data. A deduplication unit divides the acquired data by a smaller division size than that indicated in additional information included in the information stored in the information memory unit, performs deduplication, and stores the resulting data in a data memory unit. The information memory unit stores the information including the additional information that indicates the division size used for dividing data in deduplication of another device.

14 Claims, 21 Drawing Sheets

ADDITIONAL INFORMATION TABLE 151a

| DATA No. | DEDUPLICATION SIZE | EXECUTION OF DEDUPLICATION | EXECUTABILITY OF DEDUPLICATION | EXECUTABILITY OF COMPRESSION | DATA FORMAT |
|---|---|---|---|---|---|
| 1 | 0 | no | yes | yes | non |
| 2 | 16KB | yes | yes | yes | doc |
| ... | ... | ... | ... | ... | ... |

FIG. 5

BLOCK TABLE 152a

| BLOCK No. | FP |
|---|---|
| 1 | 100 |
| 2 | 120 |
| 3 | 110 |
| 4 | 100 |
| 5 | 110 |
| 6 | 101 |
| 7 | 120 |
| 8 | 100 |

SAME — SAME — SAME — SAME

FIG. 6

ADDRESS TABLE 153a

| FP | ADDRESS |
|---|---|
| 100 | 0x000 |
| 101 | 0x00c |
| 110 | 0x004 |
| 120 | 0x008 |

FIG. 7

BLOCK TABLE 252aa

| BLOCK No. | FP |
|---|---|
| 1 | 100 |
| 2 | 120 |
| 3 | 110 |
| 4 | 100 |
| 5 | 110 |
| 6 | 101 |
| 7 | 120 |
| 8 | 100 |

ELIMINATE BLOCKS HAVING SAME FP AND
GENERATE CONTROL INFORMATION

FIG. 13

CONTROL TABLE 254aa

| BLOCK No. | FP |
|---|---|
| 1 | 100 |
| 2 | 120 |
| 3 | 110 |
| 4 | 101 |

SENT AS CONTROL INFORMATION TOGETHER WITH ADDITIONAL INFORMATION

FIG. 14

CORRESPONDENCE TABLE 255ba

| BLOCK No. | FP | COPY-SOURCE FP | |
|---|---|---|---|
| 1 | 600 | 100 | 01) |
| 2 | 601 | 100 | 02) |
| 3 | 610 | 120 | 01) |
| 4 | 601 | 120 | 02) |
| 5 | 700 | 110 | 01) |
| 6 | 701 | 110 | 02) |
| 7 | 711 | 101 | 01) |
| 8 | 701 | 101 | 02) |

SAME (rows 1-2), SAME (rows 5-6)

SENT AS CORRESPONDENCE INFORMATION

FIG. 15

STORAGE DEVICE, AND PROGRAM AND METHOD FOR CONTROLLING STORAGE DEVICE

CROSS-REFERENCE TO RELATED APPLICATION

This application is based upon and claims the benefits of priority of the prior Japanese Patent Application No. 2010-056465, filed on Mar. 12, 2010, the entire contents of which are incorporated herein by reference.

FIELD

The embodiments discussed herein are related to a storage device, and program and method for controlling a storage device.

BACKGROUND

Deduplication has been used for reducing an amount of data that is increasingly stored in a memory device such as a storage device. In this deduplication, data (or record) is divided by a predetermined division size of fixed or variable length (for example, into 8 KB blocks), and a finger print (FP) is generated by calculating a hash value for each of the divided data. Then, duplicate data is detected by comparing the FPs, and only one of the data having the same FP is stored. The elimination of such duplicate data results in reducing an amount of data stored in the memory device.

There are three kinds of deduplication to store backup data in a storage device.

(1) Post-Process Deduplication

With post-process deduplication, data is stored in the storage device once, and the data is compared with each other and deduplicated at a control unit of the storage device.

(2) Client-Side Deduplication

Data is compared with each other and deduplicated at an external device such as a backup management server or a client, other than the storage device, and then stored in the storage device.

(3) In-Line Deduplication

Data is stored in the storage device while being compared with each other at the control unit of the storage device.

A reduction in an amount of data stored in a storage device is desired in terms of suppressing an increase in an amount of data in the storage device and reducing costs. Deduplication is a technique that is expected to further reduce an amount of data.

SUMMARY

According to an aspect of the invention, a storage device for performing deduplication by comparing divided data includes: an information memory unit; a data memory unit; a data acquisition unit that acquires second data obtained by deduplicating first data at another device, from the other device; an information acquisition unit that acquires first information from the other device and stores the first information in the information memory unit, the first information including first additional information indicating a first division size used for dividing the first data in the deduplication of the other device; and a deduplication unit that divides the acquired second data by a second division size smaller than the first division size indicated in the first additional information included in the stored first information, performs the deduplication on the divided second data to obtain third data, and stores the third data in the data memory unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an additional information table according to the second embodiment;

FIG. 6 illustrates a block table according to the second embodiment;

FIG. 7 illustrates an address table according to the second embodiment;

FIG. 13 illustrates a block table according to the third embodiment;

FIG. 14 illustrates a control table according to the third embodiment;

FIG. 15 illustrates a correspondence table according to the third embodiment;

DESCRIPTION OF EMBODIMENTS

Figure 1:
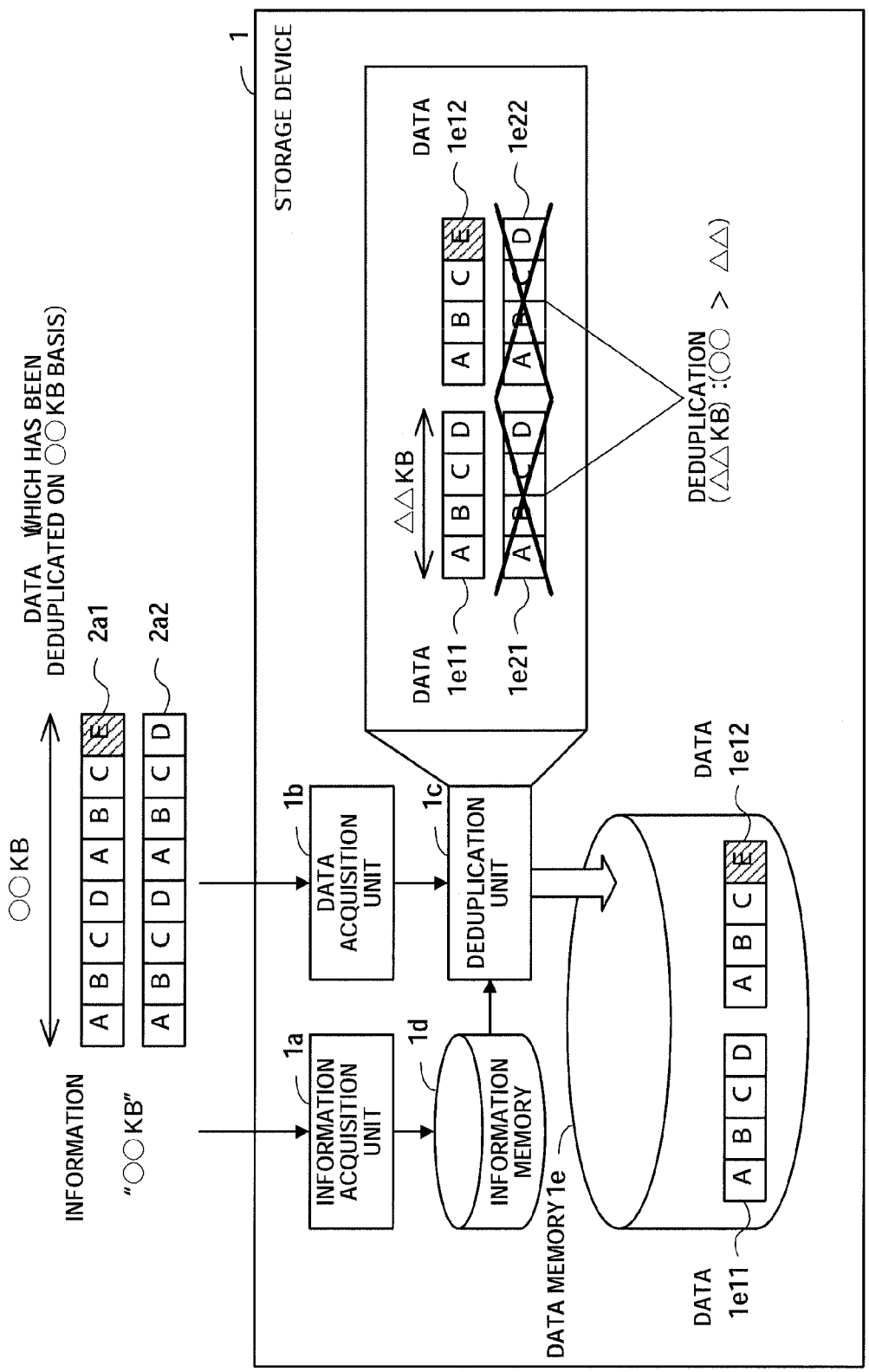
FIG. 1 illustrates a storage device according to a first embodiment.

Embodiments of the present invention will now be described with reference to the accompanying drawings, wherein like reference numerals refer to like elements throughout.

(First Embodiment)

FIG. 1 illustrates a storage device according to a first embodiment. In order to perform deduplication by dividing data and comparing the divided data with each other, a storage device 1 of this embodiment is provided with an information acquisition unit 1a, a data acquisition unit 1b, a deduplication unit 1c, an information memory 1d, and a data memory 1e.

The information acquisition unit 1a acquires information (first information) including additional information that indicates the execution status of deduplication performed by another device, such as a deduplication size indicating a data division size (for example, KB) used for dividing data (first data) in the deduplication, from the other device via a communication circuit, and stores the acquired information in the information memory 1d. For example, the other device performs client-side deduplication, and may be a backup management server or another storage device connected to the storage device 1 via a communication circuit.

The data acquisition unit 1b acquires data 2a1 and 2a2 (second data) resulting from the deduplication of the other device, from the other device via the communication circuit. Out of the illustrated squares of the data 2a1, a shaded square "E" is different from a corresponding portion "D" of the data 2a2. The data 2a1 and 2a2 have been deduplicated on a predetermined division size basis. This division size for the deduplication is indicated in the information received from the other device as described above.

The deduplication unit 1c divides the acquired data 2a1 into data 1e11 and 1e12 and also the acquired data 2a2 into 1e21 and 1e22 by a smaller division size (KB) than the division size (KB) indicated as a deduplication size in the additional information included in the information stored in the information memory 1d, and performs the deduplication, thereby eliminating the data 1e21 and 1e22 which are identical to the data 1e11 and obtaining the data 1e11 and 1e12 (third data). Then, the deduplication unit 1c stores the obtained data 1e11 and 1e12 in the data memory 1e, and deletes the data 1e21 and 1e22 marked with "X" in FIG. 1, which are identical to the data 1e11. In short, the data 2a1 and 2a2 resulting from the deduplication of the other device are divided by a smaller division size than the division size used by the other device, on the basis of the additional information, and are then deduplicated.

According to this embodiment, the deduplication unit 1c performs in-line deduplication. Alternatively, post-process deduplication may be employed, in which the data 2a1 and 2a1 acquired by the data acquisition unit 1b is stored in the data memory 1e once, and then is deduplicated.

The information memory 1d stores the information including the additional information indicating the division size that was used for dividing into the data 2a1 and 2a2 in the deduplication of the other device.

The data memory 1e has a memory area for storing data. Specifically, the data 1e11 and 1e12 resulting from the deduplication of the deduplication unit 1c is stored in this memory area.

The storage device 1 according to this embodiment acquires the data and information from the other device via the communication circuit. Alternatively, these data and information may be acquired via a storage medium such as a tape storage or a hard disk drive.

As described above, in the storage device 1, the deduplication unit 1c divides and deduplicates data by a smaller division size than the division size indicated in the additional information, which eliminates more data through the deduplication.

(Second Embodiment)

A second embodiment provides a storage device 100 having a RAID (Redundant Arrays of Inexpensive Disks) storage group with a function of performing further deduplication on data deduplicated by another device in order to eliminate more data.

Figure 2:
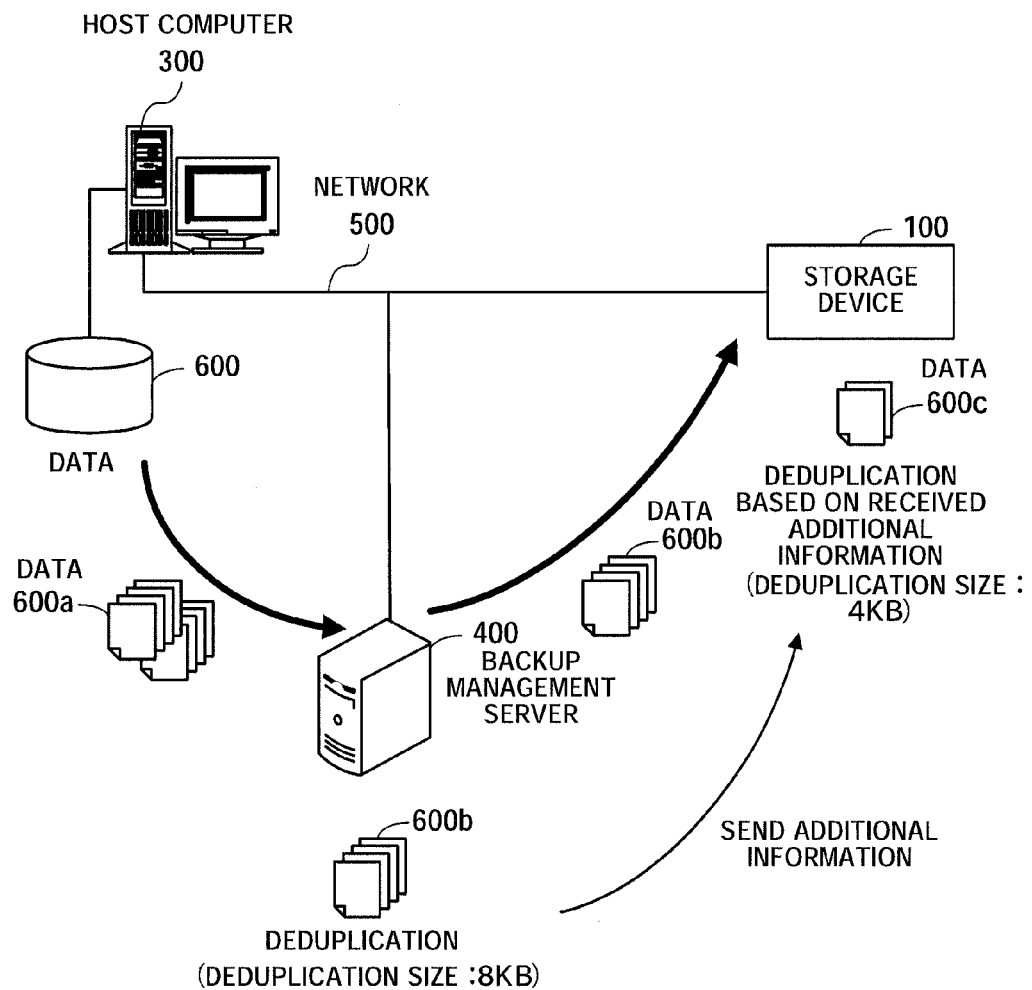
FIG. 2 illustrates a system configuration according to a second embodiment.

FIG. 2 illustrates a system configuration according to the second embodiment. An illustrated storage system includes a storage device 100, a host computer 300, a backup management server 400, and a network 500. The storage device 100, host computer 300, and backup management server 400 are able to communicate with each other over the network 500.

The storage device 100 reads and writes data from a plurality of memory devices such as Hard Disk Drives (HDDs) described later. The storage device 100 has RAID functions of RAID 0 to 6, and collectively manages a plurality of memory devices as one memory device.

Upon receipt of data 600b and additional information from the backup management server 400, the storage device 100 of this embodiment determines based on the additional information whether to perform the in-line deduplication on the received data 600b. If the deduplication is determined to be performed, the storage device 100 then determines a division size for dividing the data on the basis of the additional information, and divides and deduplicates the data 600b by the determined division size, thereby generating data 600c. The additional information is information that is sent together with deduplicated data from a device such as the backup management server 400 that has deduplicated the data, to a device such as the storage device 100 for use in the deduplication of the deduplicated data. For example, the additional information includes a division size regarding the data 600b which was used in data division and deduplication, and execution or non-execution of deduplication.

The host computer 300 stores the data 600, and uses this data 600 to perform business processing.

The backup management server 400 controls the storage device 100 over the network 500 such as Local Area Network (LAN) through scheduling management and execution control for backup, restoration, and mirroring of the data 600 stored in the host computer 300.

The backup management server 400 according to this embodiment performs client-side deduplication on the data 600a requested to be backed up by the host computer 300, to thereby generate the data 600b, also generates the additional information on the deduplication of the data 600b, and sends the generated data 600b and additional information to the storage device 100.

According to this embodiment, the backup management server 400 performs the client-side deduplication on the data 600a received from the host computer 300, and sends the resulting data 600b to the storage device 100, together with the additional information indicating the deduplication execution status including a division size used in the deduplication. This enables the storage device 100 to divide the data 600b by a smaller division size (for example, 4 KB) than the division size (for example, 8 KB) used by the backup management server 400 in the deduplication, on the basis of the additional information received from the backup management server 400, and perform in-line deduplication on the data 600b. If the storage device 100 does not receive additional information from the backup management server 400 or the backup management server 400 has not performed the data deduplication, the storage device 100 employs a predetermined division size (for example, 8 KB) to deduplicate the received data. This predetermined division size is stored in memories, not illustrated, which are included in control units 110a and 110b to be described later with reference to FIG. 3.

This embodiment sets the above-mentioned division size to be used by the storage device 100 for the deduplication as described above. In addition, the division size may be determined based on a deduplication size indicated in additional information which is sent from the backup management server 400 that has performed deduplication. For example, the division size to be used by the storage device 100 in deduplication may be set to a half of the deduplication size indicated in the additional information on the data 600b resulting from the deduplication performed by the backup management server 400.

If the backup management server 400 performs deduplication in parallel to another process imposing heavy loads, more loads may cause a processing delay in the backup management server 400. To prevent this problem, only the storage device 100 is caused to perform the deduplication, without the deduplication of the backup management server 400, so that the loads are distributed and a processing delay in the system as a whole is suppressed.

In addition, the backup management server 400 sends the storage device 100 the additional information on the data 600b, which indicates the necessity of deduplication, for example, whether the data 600b has been deduplicated and whether further deduplication is executable on the data 600b. The storage device 100 confirms the necessity of deduplication based on the additional information received from the backup management server 400 to determine whether to deduplicate the received data. This eliminates a redundant process of deduplicating the data 600b at the storage device 100 on the same division size basis as that used in the deduplication of the backup management server 400, thereby streamlining processes in the storage device 100.

Further, the storage device 100 is designed to perform data compression in addition to the deduplication, in order to reduce a memory area for storing data. This results in reducing a capacity for storing data in the storage device 100. In general, deduplication using a smaller size than a file size, for example, block- or record-based deduplication, is more advantageous in terms of a reduction in an amount of data, as compared with file-based deduplication.

It is a meaningless process that the storage device 100 compresses the data 600a that is compressed data (for example, a compressed file or image file that uses a compression technique) or has been converted into a compressed file by the backup management server 400.

By contrast, according this embodiment, the storage device 100 confirms based on the additional information whether received data is compressed data or not, in order to determine the necessity of data compression, thereby streamlining processes in the storage device 100.

Figure 3:
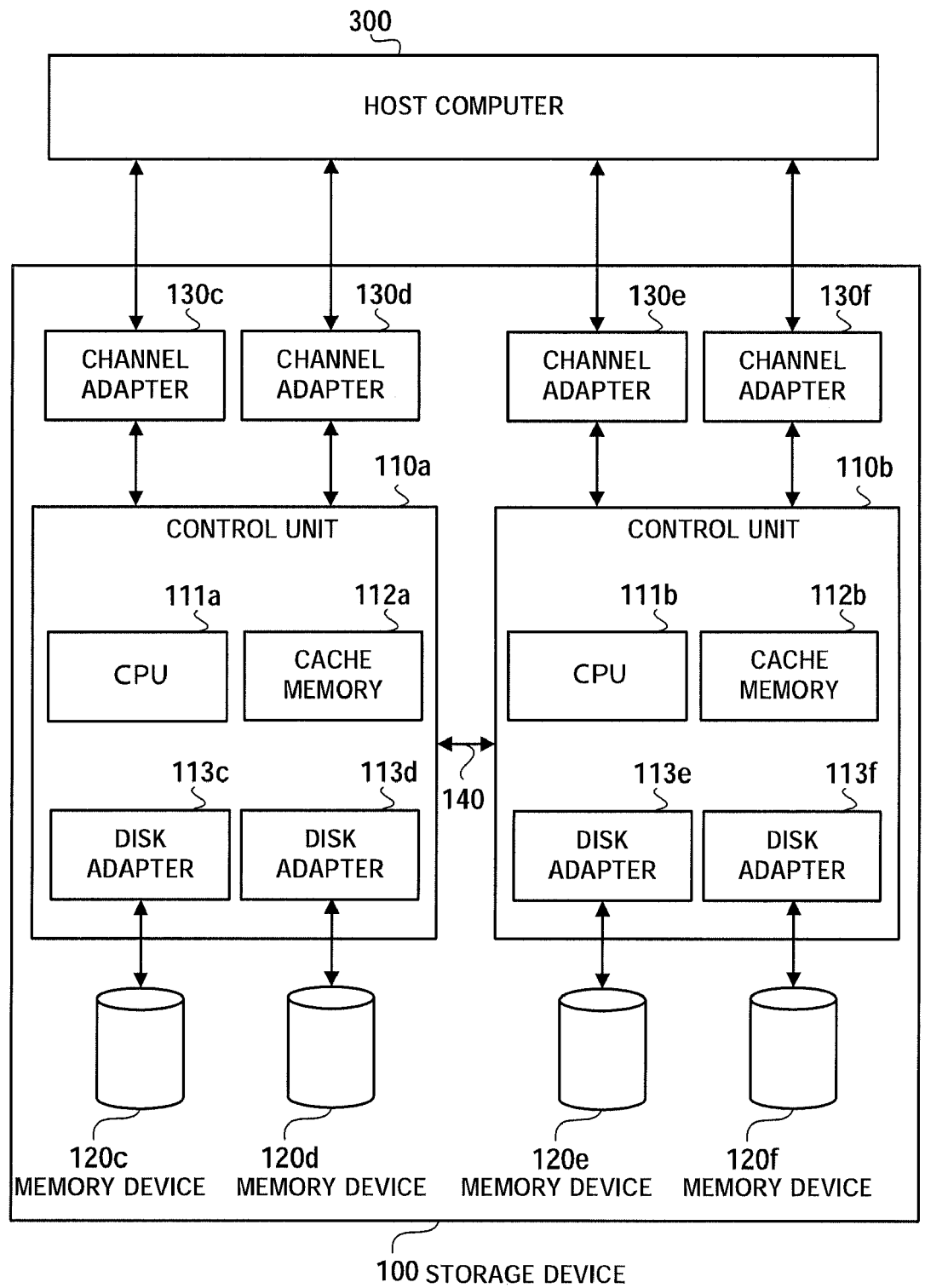
FIG. 3 illustrates a hardware configuration of a storage device according to the second embodiment.

FIG. 3 illustrates a hardware configuration of a storage device according to the second embodiment. The storage device 100 includes control units 110a and 110b for entirely controlling the device, and channel adapters 130a to 130f for controlling connections between the control units 110a and 110b and the host computer 300.

The control unit 110a includes a Central Processing Unit (CPU) 111a, a cache memory 112a, and disk adapters 113c and 113d.

The CPU 111a exercises various control in accordance with an Operating System (OS). The control unit 110a also manages resources including the cache memory 112a, memory devices 120c and 120d, and the channel adapters 130c and 130d.

The cache memory 112a stores control data used for the CPU 111a to control the storage device 100, and also temporarily stores data read and written from the memory devices 120c and 120d.

The disk adapters 113c and 113d control connections with the corresponding memory devices 120c and 120d.

The control units 110a and 110b are connected to each other via a bus 140, and communicate data and control information with each other through this bus 140. The control unit 110b includes a CPU 111b, cache memory 112b, and disk adapters 113e and 113f, as in the control unit 110a. Therefore, the explanation of them will be omitted.

The memory devices 120c to 120f are hard disk drives for storing data or backup data of system users, which is sent from the host computer 300. Such data and backup data of the system users do not need to be stored on one hard disk drive, but may be stored on a plurality of hard disk drives in a distributed manner. Further, data and backup data of a plurality of users may be stored on one hard disk drive. Still further, a nonvolatile semiconductor memory such as Flash Solid State Drive (SDD) or another type of memory device may be used as each memory device 120c to 120f as long as it is able to store data.

The channel adapters 130c to 130f control connections between the host computer 300 and the control units 110a and 110b. For example, the channel adapter 130c to 130f accepts a request from the host computer 300 and controls a connection with the control unit 110a. Each control unit 110a, 110b has a plurality of channel adapters 130c to 130f connected thereto (two in FIG. 3). That is to say, in order to realize redundant configuration, the control unit 110a is connected to two different channel adapters 130c and 130d, for example.

By the way, a LAN of fiber channels is used to realize communications between the channel adapters 130c to 130f and the host computer 300. Alternatively, another connection method may be employed. In addition, the storage device 100 may be installed at a remote location from the host computer 300 by providing a dedicated line or Virtual Private Network (VPN) for communication between the channel adapters 130c to 130f and the host computer 300.

FIG. 3 illustrates two control units 110a and 110b and four disk adapters 113c to 113f and four channel adaptors 130c to 130f, in which each control unit 110a, 110b includes two channel adaptors and is connected to two disk adaptors. However, any desired number of units may be provided.

The processing functions of this embodiment are realized with the above hardware configuration.

Figure 4:
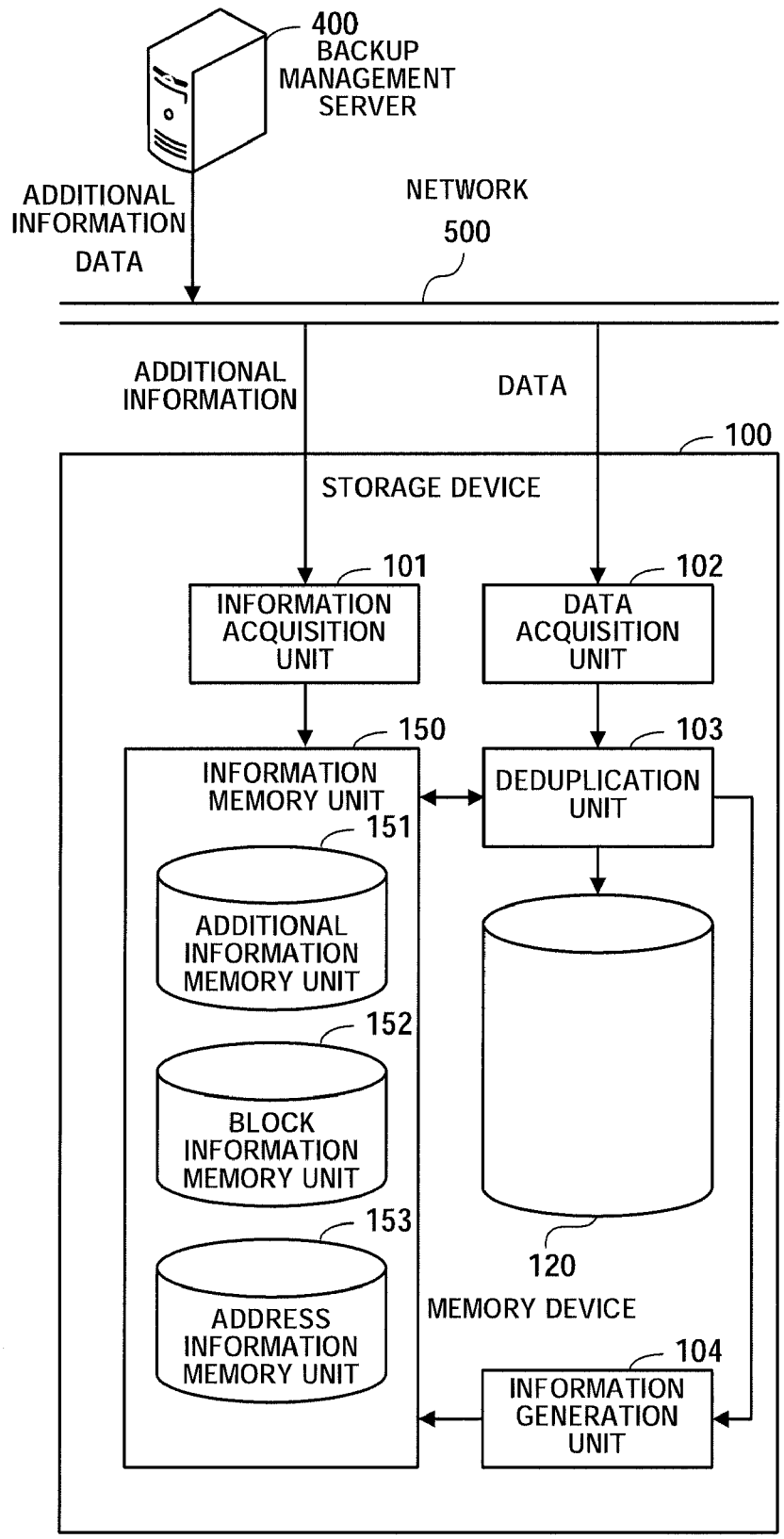
FIG. 4 is a functional block diagram of the storage device according to the second embodiment.

FIG. 4 is a functional block diagram of a storage device according to the second embodiment. The storage device 100 of this embodiment is connected to the backup management server 400 over the network 500. The storage device 100 acquires, from the backup management server 400 over the network 500, data that has been deduplicated by the backup management server 400 and is to be backed up, and performs further deduplication on the received data to reduce an amount of the data, and stores the resulting data. Thereby, the backup needs less memory capacity. To this end, the storage device 100 includes an information acquisition unit 101, a data acquisition unit 102, a deduplication unit 103, an information generation unit 104, a memory device 120, and an information memory unit 150. The information memory unit 150 includes an additional information memory unit 151, a block information memory unit 152, and an address information memory unit 153.

The information acquisition unit 101 acquires information indicating a deduplication execution status from the backup management server 400 over the network 500, and stores the acquired information in the additional information memory unit 151. The backup management server 400 is designed to be capable of performing deduplication, more specifically, client-side deduplication on data which is to be used by the host computer 300 and is to be backed up.

The data acquisition unit 102 acquires data which has been deduplicated by the backup management server 400, from the backup management server 400 over the network 500.

The deduplication unit 103 divides the data acquired by the data acquisition unit 102, by a smaller division size than that indicated in the additional information included in the information stored in the additional information memory unit 151, and performs the deduplication on the divided data (blocks). In the deduplication, the deduplication unit 103 generates an FP identifying and specifying each block, and eliminates blocks having the same FP except one. The FP is used as identification information. The deduplication unit 103 then compresses and stores the resulting data in the memory device 120. In short, it is possible to divide and deduplicate, based on the additional information, data which has been deduplicated by the backup management server 400, by a smaller division size than that used by the backup management server 400 for dividing.

If the additional information included in the information stored in the additional information memory unit 151 of the information memory unit 150 indicates the data has been deduplicated by the backup management server 400, or if the additional information included in the information stored in the additional information memory unit 151 of the information memory unit 150 indicates that deduplication of the received data is not executable, the deduplication unit 103 does not perform the deduplication on the received data, but stores the data in the memory device 120.

If the additional information included in the information stored in the additional information memory unit 151 of the information memory unit 150 indicates that compression of the received data is not executable, the deduplication unit 103 stores the data resulting from the deduplication in the memory device 120, without compressing the data.

If the additional information indicates that the received data is in incompressible format, the deduplication unit 103 may store the data resulting from the deduplication in the memory device 120, without compressing the data. In addition, the deduplication unit 103 performs in-line deduplication. Alternatively, the deduplication unit 103 may be designed to perform post-process deduplication, in which data acquired by the data acquisition unit 102 is stored into the memory device 120 once, and then is deduplicated.

The information generation unit 104 generates block information and address information, and stores them in the block information memory unit 152 and the address information memory unit 153, respectively. The block information is information that is used by the storage device 100 to identify an FP generated from a block obtained by dividing data with the deduplication function of the storage device 100. The address information is information that indicates correspondences between the FPs of divided blocks obtained with the deduplication function and the addresses of the memory areas storing the blocks identified by the FPs in the memory devices 120c to 120f.

The memory device 120 has a RAID structure with the memory devices 120c to 120f, to provide a memory area for storing data. In this memory area, data resulting from deduplication performed by the deduplication unit 103 is stored.

The additional information memory unit 151 stores additional information including a deduplication size that is a division size used for dividing data in the deduplication performed by the backup management server 400.

The additional information also indicates whether data acquired by the data acquisition unit 102 has been deduplicated by the backup management server 400, whether deduplication of the acquired data is executable, and whether compression of the acquired data is executable.

The additional information further indicates the data format of the acquired data.

The block information memory unit 152 stores block information that associates each block obtained by dividing the data 600b in deduplication with the FP of the block. The address information memory unit 153 stores address information that associates the FP of each divided block with the address of a memory area storing the block identified by the FP in the memory device 120.

By the way, the storage device 100 of this embodiment is designed to acquire data and information from the backup management server 400 over the network 500. Alternatively, the storage device 100 may acquire the data and information via a storage medium such as tape storage or hard disk drive.

FIG. 5 illustrates an additional information table according to the second embodiment. In the storage device 100, the illustrated additional information table 151a is stored in the additional information memory unit 151, and is created and managed by the information generation unit 104. The additional information table 151a is a table that stores additional information that is used by the storage device 100 to perform deduplication. The additional information includes a deduplication execution status to be used by the deduplication function of the storage device 100, for example.

The additional information table 151a has fields for "data number (No.)", "deduplication size", "execution of deduplication", "executability of deduplication", "executability of compression", and "data format". Data arranged in a horizontal direction is associated with each other to form one record of additional information.

The "data No." field contains an identification number that is assigned to data to be backed up by the storage device 100.

The "deduplication size" field contains a division size that was used for dividing data in deduplication of the backup management server 400 or the like. If the backup management server 400 has not performed deduplication on data, this "deduplication size" field contains "0".

The "execution of deduplication" field indicates whether data has been deduplicated by the backup management server 400 or the like. If data has been deduplicated by the backup management server 400, this "execution of deduplication" field contains "yes". Otherwise, the "execution of deduplication" field contains "no".

The "executability of deduplication" field indicates whether deduplication of received data is executable at the storage device 100, or whether deduplication at the storage device 100 is meaningful or meaningless. If deduplication at the storage device 100 is executable or meaningful, this "executability of deduplication" field contains "yes". If it is not executable or is meaningless, the "executability of deduplication" field contains "no".

The "executability of compression" field indicates whether compression of data at the storage device 100 is executable or not, or whether compression at the storage device 100 is meaningful or meaningless. If the compression at the storage device 100 is executable or meaningful, this "executability of compression" field contains "yes". If it is not executable or is meaningless, the "executability of compression" field contains "no".

The "data format" field contains the data format of data before deduplication was performed by the backup management server 400 or the like. In the case where received data is in incompressible format, for example, in a compressed format such as "lzh" or "zip" or in a compressed image format such as "jpg", it is judged based on this data format that compression is not executable.

FIG. 6 illustrates a block table according to the second embodiment. Within the storage device 100, the illustrated block table 152a is stored in the block information memory unit 152, and is created and managed by the information generation unit 104. The block table 152a is a table for storing block information that indicates FPs generated from the blocks obtained by dividing data with the deduplication function of the storage device 100.

The block table 152a has fields for "block No." and "FP". In this block table 152a, data arranged in a horizontal direction is associated with each other to form one record of block information.

The "block No." field contains an identification number that is assigned to a block obtained by dividing data to be deduplicated by the storage device 100.

The "FP" field contains a code to be used to determine whether blocks have the same contents, which is a hash value calculated through a hash function of a block obtained by dividing data, and is different according to the contents of the block. FP is assumed to have sufficient digits to prevent blocks having different contents from being identified identical. In this embodiment, blocks having the same FP are considered to have the same contents.

Deduplication according to this embodiment compares FPs in the block table 152a, and stores one of the blocks having the same FP in the memory device 120, and does not store the other blocks. More specifically, with reference to FIG. 6, blocks of Nos. 1, 4, and 8 have the same FP 100, so that one block (for example, block of No. 1) is stored in the memory device 120, whereas the other blocks (for example, blocks of Nos. 4 and 8) are not stored. Similarly, blocks of Nos. 2 and 7 have the same FP 120, so that one block of No. 2 is stored in the memory device 120, whereas the block of No. 7 is not stored. Yet similarly, blocks of Nos. 3 and 5 have FP 110, so that one block of No. 3 is stored in the memory device 120, whereas the other block of No. 5 is not stored. As a result, duplicate blocks are not stored in the memory device 120, which reduces a data storing area of the memory device 120.

FIG. 7 is an address table according to the second embodiment. Within the storage device 100, the illustrated address table 153a is stored in the address information memory unit 153, and is created and managed by the information generation unit 104. The address table 153a is a table for storing address information that indicates correspondences between the FPs of the blocks generated with the deduplication function of the storage device 100 and the addresses of the memory areas storing the blocks indicated by the FPs in the memory devices 120c to 120f.

The address table 153a has fields for "FP" and "address". In the address table 153a, data arranged in a horizontal direction is associated with each other to form one record of the address information.

The "address" field contains an address of an area storing the block identified by a corresponding FP in the memory devices 120c to 120f.

Figure 8:
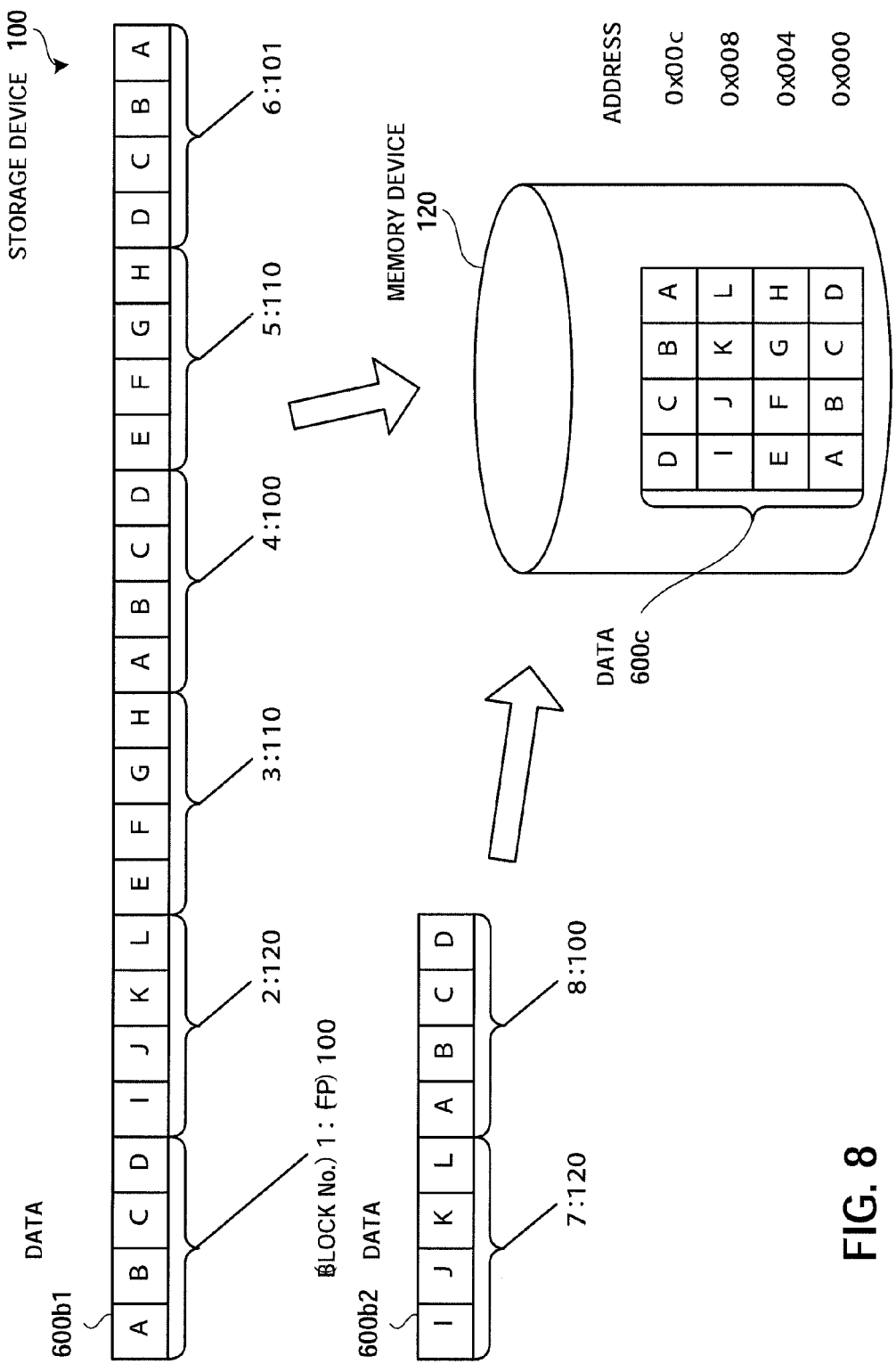
FIG. 8 illustrates how to perform deduplication according to the second embodiment.

FIG. 8 illustrates how the storage device 100 performs deduplication according to the second embodiment. When acquiring data 600b1 and 600b2 from the backup management server 400, the storage device 100 divides the data 600b1 and 600b2 into blocks of predetermined division size (for example, 4 KB) on the basis of additional information (in FIG. 8, it is assumed that one square of the data 600b1 and 600b2 is 1 KB). The storage device 100 then generates an FP for each divided block, and stores only one of blocks having the same FP in the memory device 120. Then, deduplication is performed on the data 600b1 and 600b2.

More specifically, the storage device 100 divides the data 600b1 into six blocks of Nos. 1 to 6 by a predetermined division size on the basis of the additional information. Similarly, the storage device 100 divides the data 600b2 into two blocks of Nos. 7 and 8 by the predetermined division size.

Then, the storage device 100 generates an FP for each block of No. 1 to 8, as illustrated in FIG. 8, generates block information indicating each block and its corresponding FP, and stores it in the block table 152a illustrated in FIG. 6. For example, the block of No. 1 located at the head of the data 600b1 is associated with FP 100.

Then, the storage device 100 consults the block table 152a to compare the FPs of blocks with each other, and stores blocks having different FPs and one of blocks having the same FP in the memory device 120 as data 600c. At this time, the storage device 100 obtains the addresses of the memory device 120c storing the respective blocks and stores them in the address table 153a of FIG. 7.

For example, the block of No. 1 (contents: A, B, C, D; FP: 100) of the data 600b1 and the block of No. 4 (contents: A, B, C, D; FP: 100) of the data 600b1 have the same contents, so that the same FP is generated from each of these blocks. Since the blocks of Nos. 1 and 4 have the same FP in the block table 152a, the storage device 100 stores only the block of No. 1 as part of the data 600c in the memory device 120. Then, the storage device 100 obtains an address 0x000 where the block of No. 1 is stored, and stores this address in association with FP 100 of the block of No. 1 in the address table 153a.

Similarly, consulting the block table 152a, the storage device 100 detects the blocks of Nos. 3 and 5 of the data 600b1 having the same FP through the comparison. Then, the storage device 100 stores one of them in the memory device 120 and also stores the storing address in association with the FP in the address table 153a. As to the block of No. 2, the block table 152a indicates that the data 600b1 does not have another block having the same FP, so that the storage device 100 stores this block in the memory device 120, and stores the storing address 0x008 in association with FP 120 in the address table 153a. Yet similarly, the storage device 100 stores the block of No. 6 in the memory device 120, and also stores the storing address 0x00c in association with FP 101 in the address table 153a.

Further, a block of No. 7 of the data 600b2 has FP 120. Therefore, the storage device 100 consults the block table 152a and detects that the memory device 120 stores the block of No. 2 having the same FP 120. Therefore, the storage device 100 does not store this block of No. 7 in the memory device 120. Similarly, a block of No. 8 of the data 600b2 has FP 100. The storage device 100 consults the block table 152a, and detects that the memory device 120 stores the block of No. 1 having the same FP 100. Therefore, the storage device 100 does not store this block of No. 8 in the memory device 120.

Figure 9:
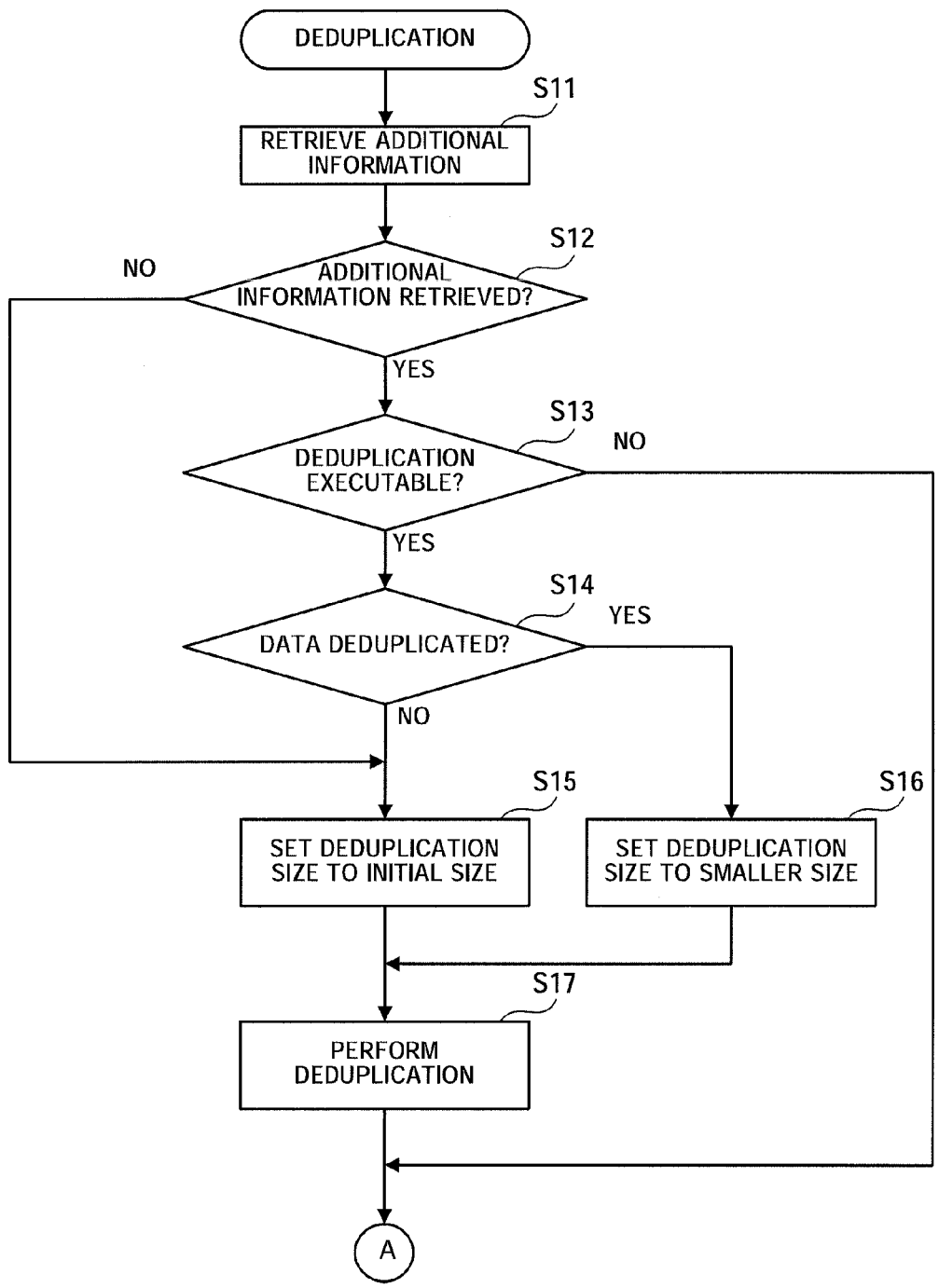
FIGS. 9 and 10 are a flowchart describing how to perform the deduplication according to the second embodiment.
Figure 10:
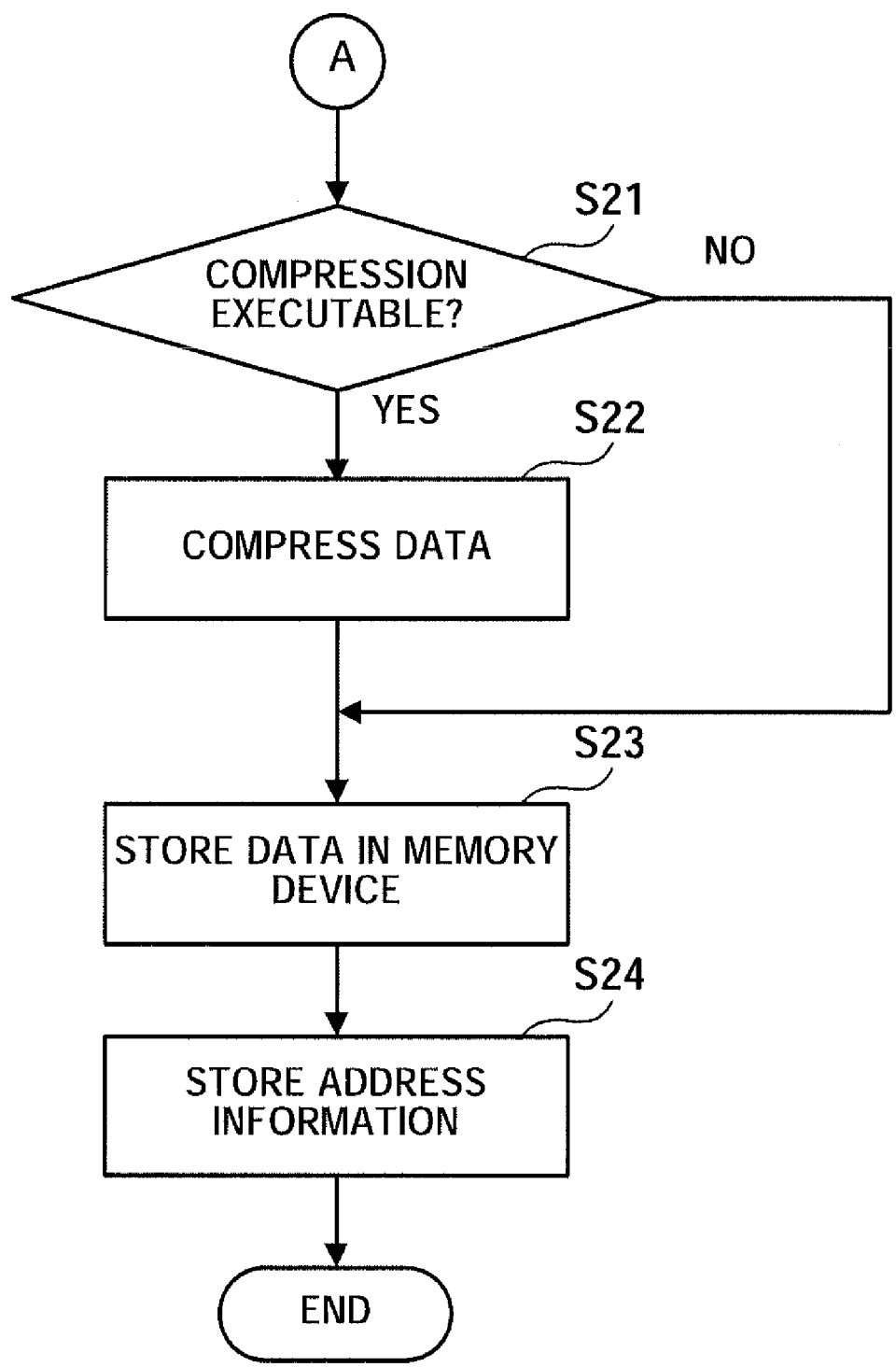

FIGS. 9 and 10 are a flowchart describing how to perform deduplication according to the second embodiment. When the data acquisition unit 102 acquires data which has been deduplicated by the backup management server 400 and is to be backed up, the storage device 100 according to this embodiment performs further deduplication on the acquired data. That is, upon receipt of data from the backup management server 400, the storage device 100 performs deduplication. The deduplication process of FIGS. 9 and 10 will be described step by step.

(Step S11) The deduplication unit 103 retrieves additional information on the data acquired by the data acquisition unit 102 from the additional information memory 151.

(Step S12) The deduplication unit 103 determines whether the additional information on the data has been retrieved at step S11 or not. If the additional information has been retrieved, the process goes on to step S13. Otherwise, the process goes on to step S15.

(Step S13) The deduplication 103 determines based on the retrieved additional information whether deduplication of the acquired data is executable or not. If it is executable, the process goes on to step S14. Otherwise, the process goes on to step S21 (FIG. 10).

(Step S14) The deduplication unit 103 determines based on the retrieved additional information whether the acquired data has been deduplicated by the backup management server 400 or the like. If the data has been deduplicated, the process goes on to step S16. Otherwise, the process goes on to step S15.

(Step S15) The deduplication unit 103 sets a division size for use in deduplication of the deduplication unit 103 to an initial size (for example, 8 KB).

(Step S16) The deduplication unit 103 sets a division size for use in deduplication of the deduplication unit 103 to a smaller division size than that used by the deduplication of the backup management server 400 or the like (for example, if the backup management server 400 or the like used a division size of 8 KB in deduplication, then the division size is set to 4 KB).

(Step S17) The deduplication unit 103 performs deduplication on the data.

(Step S21) The deduplication unit 103 determines based on the retrieved additional information whether compression of the data is executable or not. If it is executable, the process proceeds on to step S22. Otherwise, the process proceeds on to step S23.

(Step S22) The deduplication unit 103 compresses the data.

(Step S23) The deduplication unit 103 stores the data which is not duplicate, in the memory device 120.

(Step S24) The information generation unit 104 stores address information indicating the areas of the memory devices where the data was stored at step S23, in the address information memory unit 153.

As described above, the storage device 100 according to the second embodiment reduces an amount of data to be stored in the storage device by using both client-side deduplication and in-line deduplication, so that the data deduplication provides a more enhanced effect in data reduction.

It is not effective in terms of a reduction in an amount of data that a storage device performs in-line deduplication on data which has been subjected to client-side deduplication, after dividing the data by a larger division size than that used in the client-side deduplication. This is because further deduplication using the same or larger division size is not meaningful. By contrast, the deduplication unit 103 according to this embodiment performs deduplication after dividing data by a smaller division size than that indicated in additional information, thereby making it possible to further reduce an amount of data through the deduplication.

In addition, if deduplication of data is not executable, the deduplication unit 103 skips deduplication, thereby achieving efficient deduplication. This prevents extra loads from being imposed on the storage device 100.

Further, the deduplication unit 103 compresses and stores data in the memory device 120 after deduplicating the data, thereby making it possible to further reduce an amount of data in the storage device 10.

Still further, if compression of data is not executable, the deduplication unit 103 skips the data compression. This prevents extra loads from being imposed on the storage device 100.

In addition, in general, deduplication using a smaller division size provides a more enhanced effect in terms of a reduction in an amount of data. However, deduplication using a small division size imposes processing loads on a device which performs the deduplication. By contrast, according to the second embodiment, the storage device 100 and the backup management server 400 dispersedly perform deduplication, which realizes effective deduplication. As a result, it is possible to increase a reduction in an amount of data through the deduplication while preventing loads from concentrating on the storage device 100 or the backup management server 400.

(Third Embodiment)

The following describes a third embodiment, focusing on different features from the second embodiment. The same reference numerals are used in this embodiment as in the second embodiment for corresponding components, and the explanation thereof will be omitted. When two storage devices duplicate backup data, the third embodiment causes a copy-destination storage device to perform further deduplication on data which has already been deduplicated by a copy-source storage device.

Figure 11:
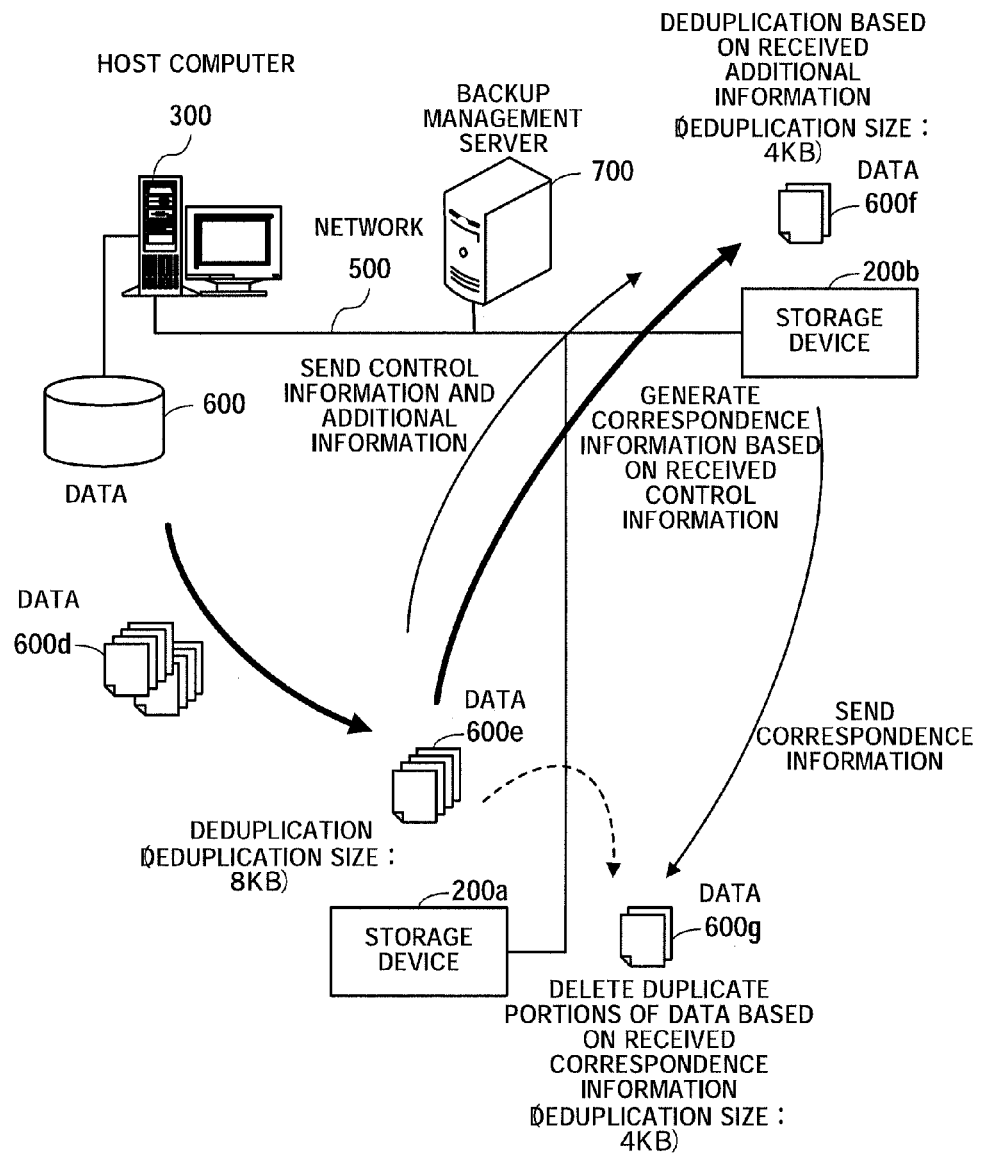
FIG. 11 illustrates a system configuration according to a third embodiment.

FIG. 11 illustrates a system configuration according to the third embodiment. According to this embodiment, when backup data is duplicated, a copy-source storage device 200a performs deduplication, and sends a copy-destination storage device 200b additional information indicating a division size used in the deduplication. The copy-destination storage device 200b performs further deduplication after dividing data by a smaller division size than that indicated in the additional information received from the copy-source storage device 200a.

The storage system of FIG. 11 includes storage devices 200a and 200b, a host computer 300, a backup management server 700, and a network 500. The storage devices 200a and 200b, host computer 300, and backup management server 700 are able to communicate with each other over the network 500.

The storage devices 200a and 200b read and write data from memory devices. Each storage device 200a and 200b has RAID functions of RAID 0 to 6, and collectively manages a plurality of memory devices as one memory device.

The storage device 200a performs in-line deduplication on data 600d requested to be backed up by the host computer 300 to thereby generate data 600e, and also generates additional information and control information, and sends these data 600e, additional information and control information to the storage device 200b. The additional information indicates the deduplication execution status of the data 600e, and is stored in additional information memory units 251a and 251b of the storage devices 200a and 200b, as will be described with reference to FIG. 12. The control information is information that indicates correspondences between the divided blocks of the data 600e and the FPs of these blocks, and is stored in control information memory units 254a and 254b of the storage devices 200a and 200b, as will be described with reference to FIG. 12.

Upon receipt of correspondence information from the storage device 200b, the storage device 200a eliminates duplicate blocks of the data 600e based on the correspondence information. The correspondence information is information that indicates correspondences between the blocks of the copy-source data 600e that has been deduplicated by the storage device 200a and is stored in the copy-source storage device 200a and blocks obtained by dividing the data 600e at the storage device 200b, by using their FPs. The correspondence information is stored in the correspondence information memory units 255a and 255b in the storage devices 200a and 200b, as will be described with reference to FIG. 12.

The correspondence information of this embodiment uses the FPs of blocks obtained by dividing data to indicate correspondences between the blocks. Alternatively, another kind of information may be used as long as it uniquely identifies a block. As an example, a code may be assigned to a divided block obtained in deduplication. In addition, similarly to this correspondence information, another kind of information that uniquely identifies a block may be used, instead of FPs, in the control information.

Upon receipt of the deduplicated data 600e, additional information, and control information from the storage device 200a, the storage device 200b performs in-line deduplication on the data 600e based on the additional information, and also generates correspondence information between the data 600e and the blocks obtained by dividing the data 600e in the deduplication, on the basis of the received control information and the FPs of the divided blocks of the data 600e obtained in the deduplication, and sends the correspondence information to the storage device 200a.

The host computer 300 stores the data 600. In addition, the host computer 300 performs business processing using the stored data 600.

The backup management server 700 controls the storage devices 200a and 200b via the network 500 such as LAN through scheduling management and execution control, in order to execute backup, restoration, mirroring, and so on of the data 600 stored in the host computer 300.

In this embodiment, the storage device 200a performs in-line deduplication on the data 600d received from the host computer 300, and sends the storage device 200b additional information indicating the deduplication execution status and control information indicating correspondences between the blocks of the data 600e resulting from the deduplication of the data 600d and the FPs of the blocks. The additional information sent from the storage device 200a indicates the necessity of deduplication of the data 600e, such as whether the data 600e has been deduplicated, a division size used in the deduplication if the data 600e has been deduplicated, and executability of deduplication of the data 600e at the storage device 200b.

The storage device 200b confirms the necessity of deduplication of the received data on the basis of the additional information received from the storage device 200a, and determines whether to perform the deduplication. In performing the in-line deduplication on the data 600e on the basis of the additional information, the storage device 200b divides the data 600e by a smaller division size (for example, 4 KB) than that used in the deduplication performed by the storage device 200a. This makes it possible to eliminate a meaningless process of performing further deduplication on the data 600e, which has been deduplicated by the storage device 200a, by the same division size at the storage device 200b.

If the storage device 200b does not receive the additional information from the storage device 200a or if the storage device 200a has not performed the deduplication, the storage device 200b performs the deduplication on the data received from the storage device 200a after dividing the data by a predetermined size (for example, 8 KB).

In addition, in order to reduce an area storing data, the storage devices 200a and 200b perform data compression, in addition to the deduplication. This further reduces a capacity used to store data in the storage devices 200a and 200b. Further, in general, as compared with file-based deduplication, deduplication using a smaller division size, for example, block- or record-based deduplication, is more advantageous in reducing an amount of data.

It is a meaningless process that the storage device 200b compresses data 600d that is in a compressed format or has been converted to a compressed format by the storage device 200a.

By contrast, according to this embodiment, the additional information allows the storage device 200b to determine whether to perform compression based on whether received data is compressed data or not. This makes it possible to streamline processes in the storage device 200b.

Further, the storage device 200b performs the deduplication on data which has been deduplicated by the storage device 200a, by a smaller division size. This makes it possible to eliminate more data through the deduplication and thereby reduce an amount of data stored in the copy-destination storage device 200b.

If data has not been deduplicated by the storage device 200a, if additional information is not sent from the storage device 200a, or if a division size used by the storage device 200a is not confirmed, the storage device 200b performs the deduplication on received data after dividing the data by a predetermined division size.

When the storage device 200b deduplicates data by a smaller division size than that used by the storage device 200a, the storage device 200b sends the storage device 200a correspondence information generated based on control information received from the storage device 200a. Upon receipt of the correspondence information, the storage device 200a eliminates duplicate blocks of the data 600e based on the correspondence information, thereby generating data 600g. The correspondence information indicates correspondences between the blocks of the data 600e and the blocks obtained by dividing the data 600e in the deduplication performed by the storage device 200b.

As a result, the same reduction in the amount of data stored in the storage device 200a is achieved as that produced by the deduplication performed by the storage device 200b.

In addition, as described above, the storage device 200b performs the deduplication using a smaller division size than that used in the deduplication performed by the storage device 200a. That is, in this embodiment, if the storage device 200a performs the deduplication using a predetermined division size, the storage device 200b does not perform the deduplication using the same division size.

Therefore, the storage device 200a eliminates the necessity of independent deduplication and eliminates duplicate blocks of the same small division size as that used in the storage device 200b, on the basis of the correspondence information. This achieves reducing loads and time in the storage device 200a and also reducing an amount of data in the storage device 200a.

If there is no correspondence information coming from the storage device 200b, the storage device 200a does not eliminate duplicate blocks of the data 600e.

Figure 12:
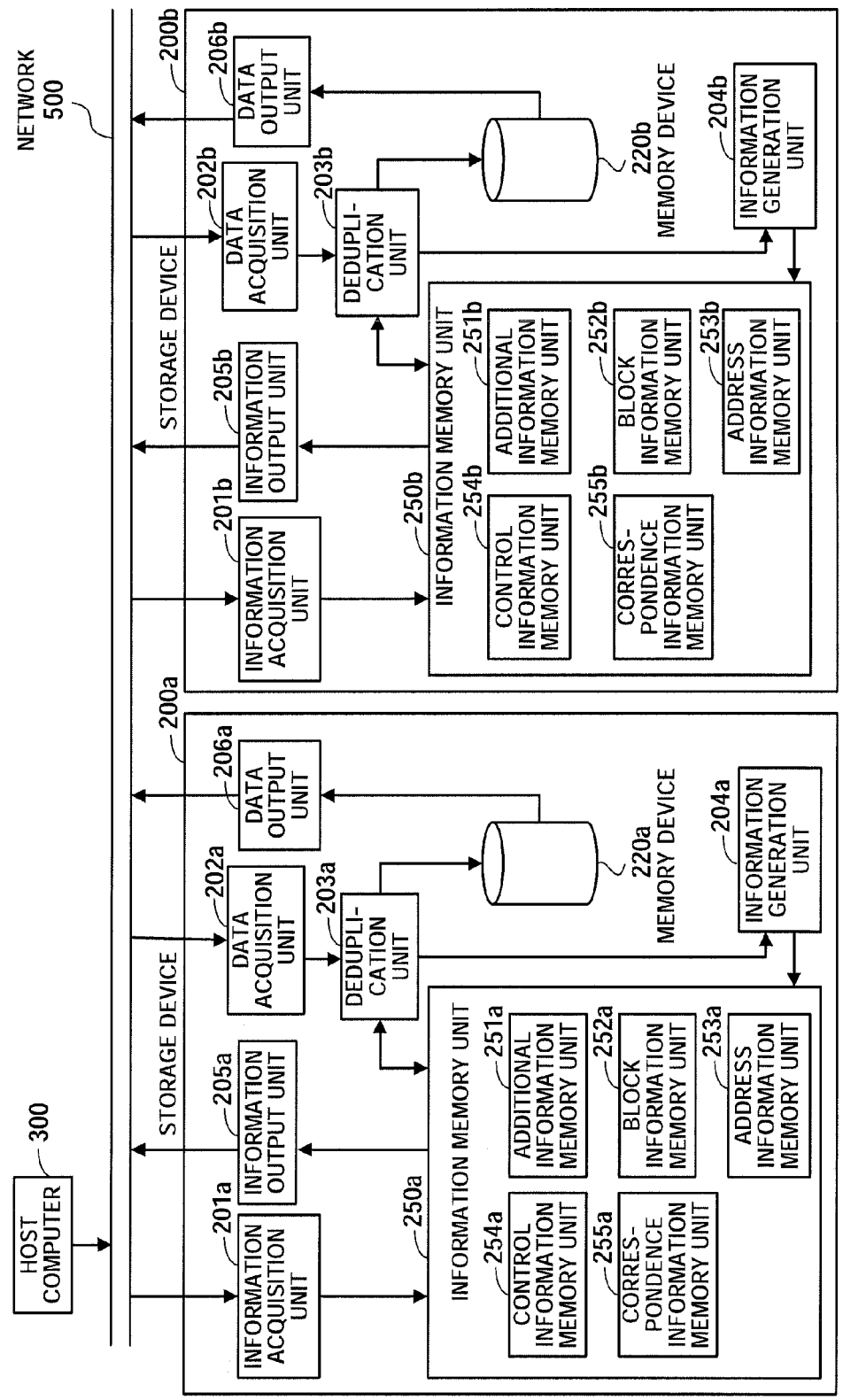
FIG. 12 is a functional block diagram of a storage device according to the third embodiment.

FIG. 12 is a functional block diagram of a storage device according to the third embodiment. The storage devices 200a and 200b of this embodiment are connected to each other and also to the host computer 300 over the network 500.

The storage device 200a acquires data to be backed up from the host computer 300 over the network 500, performs in-line deduplication on the data to reduce an amount of the data, and stores the resulting data. Thereby, a memory capacity for backup is reduced.

The storage device 200b acquires the data deduplicated by the storage device 200a, over the network 500, performs in-line deduplication on the data to further reduce an amount of the data, and stores the resulting data. Thereby, a memory capacity for backup is further reduced.

In addition, upon receipt of correspondence information from the storage device 200b, the storage device 200a eliminates duplicate blocks of the data stored in the memory device 220a on the basis of the received correspondence information, which achieves the same reduction in a memory capacity used for backup as that produced by the storage device 200b.

The storage device 200a includes an information acquisition unit 201a, a data acquisition unit 202a, a deduplication unit 203a, an information generation unit 204a, an information output unit 205a, a data output unit 206a, the memory device 220a, and an information memory unit 250a. The information memory unit 250a includes an additional information memory unit 251a, a block information memory unit 252a, an address information memory unit 253a, a control information memory unit 254a, and a correspondence information memory unit 255a.

The information acquisition unit 201a acquires information (for example, additional information and correspondence information) indicating a deduplication execution status over the network 500 from a device such as the storage device 200b which is capable of performing deduplication, and stores the acquired information in the additional information memory unit 251a.

The data acquisition unit 202a is capable of acquiring data to be backed up in the storage system, over the network 500 from the host computer 300 or the like. The data acquisition unit 202a is also capable of acquiring data deduplicated by the storage device 200b, over the network 500 from the storage device 200b.

The deduplication unit 203a divides the data acquired by the data acquisition unit 202a, by a smaller division size than that indicated in the additional information included in the information that was received from another device and is stored in the additional information memory unit 251a, and performs the deduplication on the divided data (blocks), thereby generating data. In the deduplication, the deduplication unit 203a generates an FP identifying each block, and eliminates blocks having the same FP except one. FPs are used as identification information. Then, the deduplication unit 203a compresses and stores the data resulting from the deduplication in the memory device 220a. That is to say, data deduplicated by the storage device 200b or the like is deduplicated after being divided by a smaller division size than that used by the storage device 200b or the like, on the basis of additional information.

If the additional information included in the information stored in the additional information memory unit 251a of the information memory unit 250a indicates that the data has been deduplicated by the storage device 200b or the like, or if the additional information indicates that deduplication of the data is not executable, then the deduplication unit 203a stores the data in the memory device 220a without further deduplication.

If the additional information included in the information stored in the additional information memory unit 251a of the information memory unit 250a indicates that compression of the received data is not executable, then the deduplication unit 203a does not compress the data resulting from the deduplication, but stores the data in the memory device 220a.

If the additional information indicates that the received data is in incompressible format, the deduplication unit 203a does not compress the data resulting from the deduplication, but stores the data in the memory device 220a. In addition, the deduplication unit 203a performs in-line deduplication. Alternatively, the deduplication unit 203a may perform post-process deduplication, in which data acquired by the data acquisition unit 202a is stored in the memory device 220a once and then is deduplicated.

When the block information in the block information memory unit 252a is updated by the information generation unit 204a based on the correspondence information received from the storage device 200b, the deduplication unit 203a eliminates the same blocks as those eliminated through the deduplication performed by the storage device 200b, from the data stored in the memory device 220a on the basis of the correspondences indicated by the updated block information.

The information generation unit 204a generates and stores additional information, block information, address information, control information, and correspondence information in the additional information memory unit 251a, block information memory unit 252a, address information memory unit 253a, control information memory unit 254a, and correspondence information memory unit 255a, respectively.

The information generation unit 204a generates control information by deleting information on blocks having the same FP except one, on the basis of block information. Thus generated control information indicates correspondences between the divided blocks of data to be deduplicated and the FPs of the blocks, as will be described in detail with reference to FIG. 14.

Further, when additional information, control information, and correspondence information arrive from the storage device 200b, the information generation unit 204a stores them in the additional information memory unit 251a, control information memory unit 254a, and correspondence information memory unit 255a, respectively.

When receiving correspondence information from the storage device 200b, the information generation unit 204a updates the block information stored in the block information memory unit 252a on the basis of the received correspondence information, as will be described in detail with reference to FIG. 19. Then, according to the updating of the block information and eliminating of blocks by the deduplication unit 203a, the information generation unit 204a updates the address information in the address information memory unit 253a.

The information output unit 205a, sends information generated by the information generation unit 204a to the storage device 200b over the network 500.

The data output unit 206a sends data resulting from the deduplication performed by the deduplication unit 203a, to the memory device 200b via the network 500.

The memory device 220a has a RAID structure with a plurality of memory devices (not illustrated), and has a memory area for storing data. Data resulting from deduplication performed by the deduplication unit 203a is stored in this memory area.

The additional information memory unit 251a stores additional information indicating a division size used for dividing data in deduplication of the deduplication unit 203a, the storage device 200b, or the like. The additional information also indicates whether the data acquired by the data acquisition unit 202a has been deduplicated by the storage device 200b or the like, whether deduplication of the received data is executable, and whether compression of the received data is executable. The additional information further indicates the data format of the received data.

The block information memory unit 252a stores block information that associates blocks with FPs. The address information memory unit 253a stores address information that associates the FPs with the memory areas storing the blocks indicated by the FPs in the memory device 220a.

The block information stored in the block information memory unit 252a is information that indicates correspondences between the divided blocks of data which has been deduplicated by the deduplication unit 203a but has not been deduplicated by the storage device 200b and the FPs of the blocks. The block information is sent together with the additional information to the storage device 200b.

Similarly to the storage device 200a, the storage device 200b has an information acquisition unit 201b, a data acquisition unit 202b, a deduplication unit 203b, an information generation unit 204b, an information output unit 205b, a data output unit 206b, a memory device 220b, and an information memory unit 250b. The information memory unit 250b has an additional information memory unit 251b, a block information memory unit 252b, an address information memory unit 253b, a control information memory unit 254b, and a correspondence information memory unit 255b.

Block information stored in the block information memory unit 252b is used as correspondence information that indicates correspondences between the divided blocks of data which has been deduplicated by the storage device 200a but has not been deduplicated by the deduplication unit 203b and the blocks obtained by dividing the data in the deduplication performed by the deduplication unit 203b.

The information generation unit 204b generates correspondence information that indicates correspondences between data stored in the copy-source storage device 200a and the divided blocks obtained by the copy-destination storage device 200b, as will be described later with reference to FIG. 15.

FIG. 13 illustrates a block table according to the third embodiment. In the storage device 200a, the illustrated block table 252aa is stored in the block information memory unit 252a, and is created and managed by the information generation unit 204a. This block table 252aa is a table for storing block information indicating FPs generated from the blocks obtained by dividing data with the deduplication function of the storage device 200a.

The block table 252aa of FIG. 13 has fields for "block No." and "FP". Information arranged in a horizontal direction in the block table 252aa is associated with each other to form one piece of block information of the storage device 200a. This block information is generated when deduplication is performed at the storage device 200a, and is sent together with additional information to the storage device 200b.

The "block No." field contains an identification number assigned to a divided block generated by the storage device 200a.

The "FP" field contains an FP of a block of corresponding block No. This FP is generated by the storage device 200a.

Similarly to the second embodiment, in the deduplication according to the third embodiment, the storage device 200a compares FPs in the block table 252aa, and stores only one of blocks having the same FP in the memory device 220a, but eliminates the other blocks. The storage device 200b performs the same deduplication, and therefore explanation thereof is not repeated.

In addition, in the deduplication according to this embodiment, after searching the block information stored in the block table 252aa and eliminating blocks having the same FPs, the storage device 200a generates control information, as will be described later with reference to FIG. 14.

FIG. 14 illustrates a control table according to the third embodiment. In the storage device 200a, the illustrated control table 254aa is stored in the control information memory unit 254a, and is created and managed by the information generation unit 204a. The control table 254aa is a table for storing control information that indicates correspondences between the blocks of the data deduplicated with the deduplication function of the storage device 200a and the FPs of the blocks.

Similarly to the block table 252aa of FIG. 13, the control table 254aa of FIG. 14 has fields for "block No." and "FP". In this control table 254aa, information arranged in a horizontal direction is associated with each other to form one piece of control information of the storage device 200a. This control information is generated when deduplication is performed by the storage device 200a, and is sent together with additional information to the storage device 200b.

The "block No." field contains an identification number assigned to a divided block obtained by the storage device 200a.

The "FP" field contains an FP of a block of corresponding block No. This FP is generated by the storage device 200a.

The following describes differences between control information and block information according to this embodiment. Similarly to the second embodiment, the storage devices 200a and 200b of this embodiment perform deduplication by generating block information as described with reference to FIG. 13, and storing only one of blocks having the same FP of the block information. The control information of this embodiment is different from the block information in that the control information indicates only one of blocks having the same FP as a result of the deduplication. That is, the control information is generated by retaining only one of blocks having the same FP from the block information of the storage device 200a described earlier with reference to FIG. 13.

Sending this control information together with the data deduplicated by the storage device 200a to the storage device 200b enables the storage device 200b to recognize the correspondences between the blocks of the data deduplicated by the storage device 200a and the FPs of the blocks.

According to this embodiment, after the deduplication is performed, the storage device 200a sends additional information and control information to the storage device 200b together with the resulting data 600e.

FIG. 15 illustrates a correspondence table according to the third embodiment. In the storage device 200b, the illustrated correspondence table 255ba is stored in the correspondence information memory unit 255b, and is created and managed by the information generation unit 204b. The correspondence table 255ba is a table to store correspondence information that indicates correspondences between data stored in the copy-source storage device 200a and blocks generated by the storage device 200b dividing the data.

The correspondence table 255ba of FIG. 15 has fields for "block No.", "FP", and "copy-source FP". Information arranged in a horizontal direction in the correspondence table 255ba is associated with each other to form one piece of correspondence information of the storage device 200b.

The "block No." field contains an identification number assigned to a divided block generated by the storage device 200b.

The "FP" field contains an FP of a block of corresponding block No. This FP is generated by the storage device 200b.

The "copy-source FP" field contains a copy-source FP assigned to a block of the data 600e generated through the deduplication of the copy-source storage device 200a.

The correspondence information of the storage device 200b associates copy-source FPs and FPs to thereby indicate correspondences between FPs assigned to the divided blocks of data 600e generated by the copy-source storage device 200a and FPs assigned to the blocks generated by dividing the data 600e in the deduplication performed by the copy-destination storage device 200b.

In this embodiment, the divided blocks obtained by the storage device 200a are further divided and deduplicated in the storage device 200*b*. In the example of FIG. 15, a copy-source FP includes the FP of a divided block generated by the copy-source storage device 200*a*, which is to be further divided by the storage device 200*b*, and information indicating what number the block is in the divided blocks generated by the storage device 200*b*. For example, as to a block of No. 1, its corresponding copy-source FP of "100 (01)" means that this block is the first block of the divided blocks generated by the storage device 200*b* dividing the block of FP "100" generated by the storage device 200*a*.

In this embodiment, after data received from the storage device 200*a* is deduplicated by the storage device 200*b*, information indicating the FPs and the copy-source FPs is sent as correspondence information from the storage device 200*b* to the storage device 200*a*. The storage device 200*a* eliminates duplicate blocks of the stored data on the basis of the received correspondence information and the block table 252*aa*, as will be described in detail with reference to FIG. 19.

Figure 16:
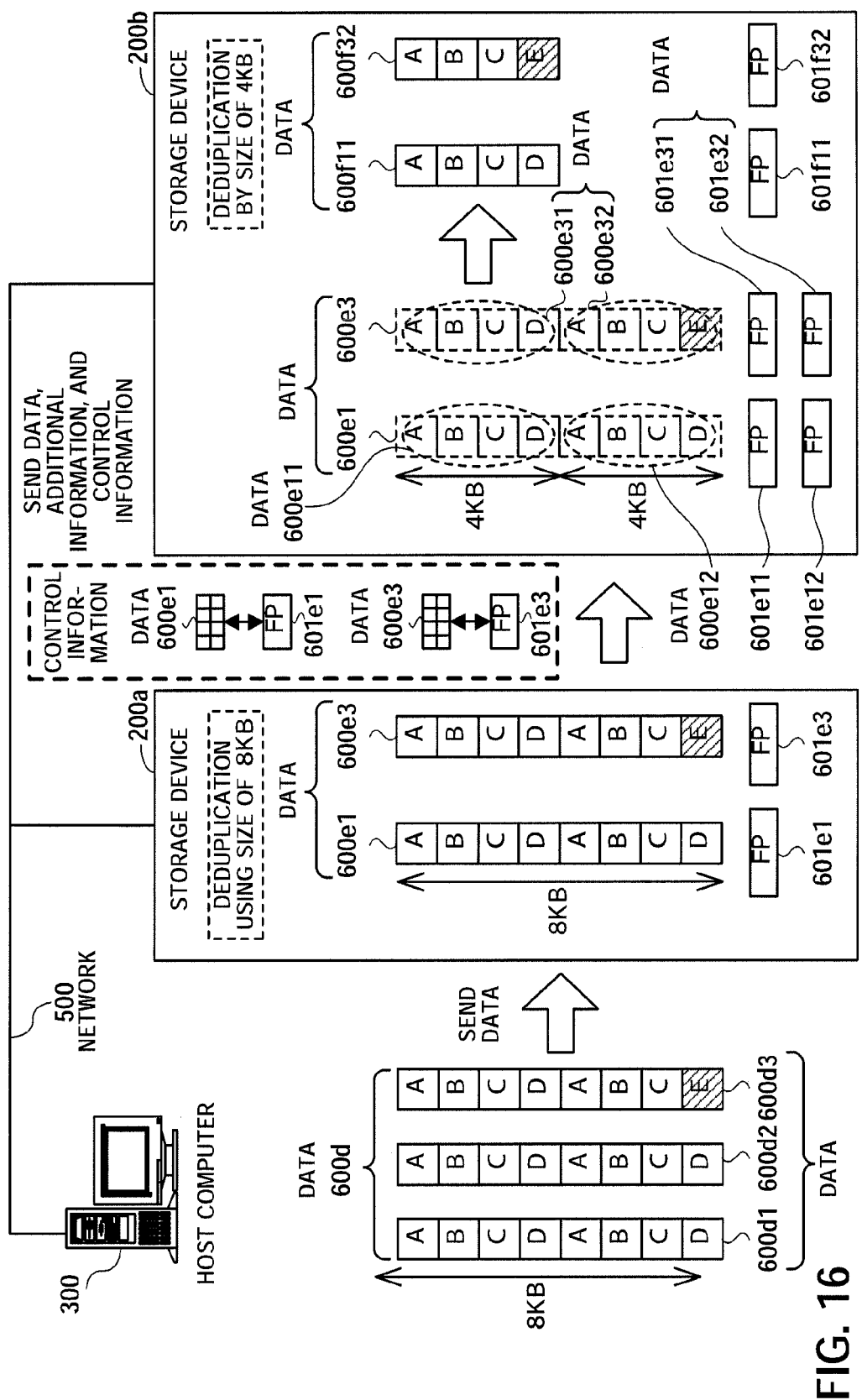
FIGS. 16 and 17 illustrate how to perform deduplication according to the third embodiment.
Figure 17:
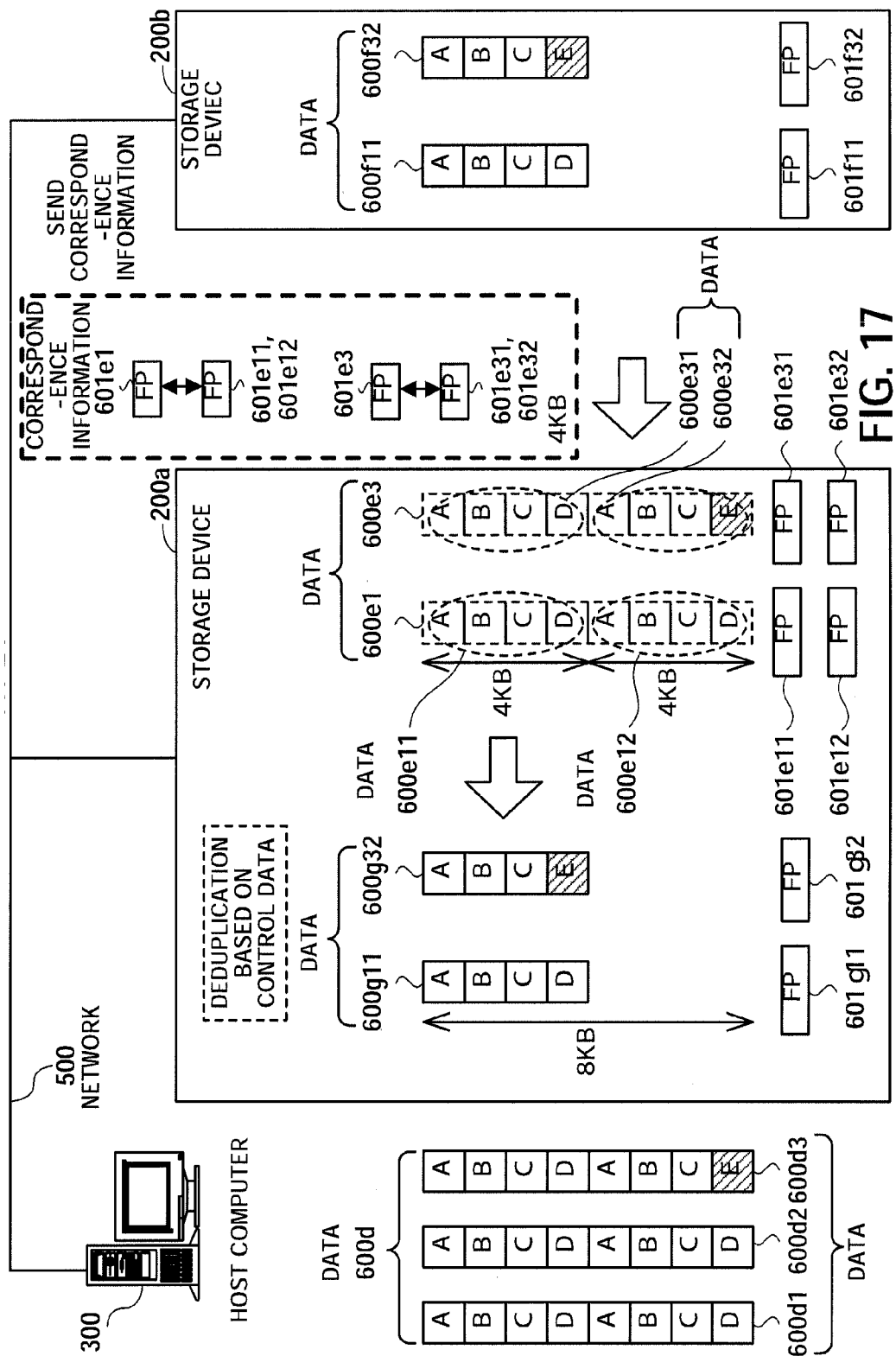

With reference to FIGS. 16 and 17, the following describes how the storage devices 200*a* and 200*b* perform deduplication according to the third embodiment.

In this embodiment, the storage device 200*a* acquires the data 600*d* from the host computer 300 over the network 500 as illustrated in FIG. 16. This data 600*d* is one piece of consecutive data, and it is assumed that, if the data 600*d* is divided into three pieces of data 600*d*1, 600*d*2, and 600*d*3 by a predetermined division size (for example, 8 KB), the data 600*d*1 and 600*d*2 have the same contents. The data 600*d*3, on the other hand, has one square "E" indicated by oblique lines, which is different from a corresponding part "D" of the data 600*d*1 and 600*d*2.

Then, the storage device 200*a* divides the acquired data 600*d* into blocks of predetermined division size, and generates FPs for the respective blocks, generates block information indicating the blocks and their corresponding FPs, and stores it in the block information memory unit 252*a*. Then, the storage device 200*a* consults the block information to store one of blocks having the same FP in the memory device 220*a*, without storing the other blocks. Then, the storage device 200*a* generates control information indicating the blocks stored in the memory device 220*a* and their corresponding FPs, and stores it in the control information memory unit 254*a*. In the deduplication, the storage device 200*a* also generates additional information. Then, the storage device 200*a* sends the stored data and the generated additional information and control information to the storage device 200*b*.

More specifically, the storage device 200*a* divides the data 600*d* into blocks of predetermined division size, and generates FPs (not illustrated) for the respective data 600*d*1 to 600*d*3. The storage device 200*a* then generates block information indicating the data 600*d*1 to 600*d*3 and their corresponding FPs. At this time, the data 600*d*2 has the same contents as the data 600*d*1, so that the FP of the data 600*d*2 is the same as that of the data 600*d*1. As a result, the storage device 200*a* does not store the data 600*d*2 in the memory device 220*a*. The storage device 200*a* stores the data 600*d*1 which has the same FP as the data 600*d*2 and is selected to be stored, and the data 600*d*3 which has a different FP from the others in the memory device 220*a* as data 600*e*1 and 600*e*3, respectively. In addition, the storage device 200*a* generates control information by associating the data 600*e*1 with its corresponding FP 601*e*1 and the data 600*e*3 with its corresponding FP 601*e*3, and stores the control information in the control information memory unit 254*a*. The storage device 200*a* also generates address information by associating FP 601*e*1 with the address of the memory area storing the corresponding data 600*e*1 and FP 601*e*3 with the address of the memory area storing the corresponding data 600*e*3, and stores the address information in the address information memory unit 253*a*. Then, the storage device 200*a* sends the data 600*e*1 and 600*e*3, and their additional information and control information to the storage device 200*b* over the network 500.

Upon receipt of the data 600*e*1 and 600*e*3, and their corresponding additional information and control information from the storage device 200*a*, the storage device 200*b* divides the received data 600*e*1 and 600*e*3 into blocks of smaller division size (for example, 4 KB) than that used in the deduplication of the storage device 200*a* and indicated in the additional information.

Then, the storage device 200*b* generates an FP for each divided block, generates and stores block information indicating each block and a corresponding FP in the block information memory unit 252*b*. Then, the storage device 200*b* stores one of blocks having the same FP in the memory device 220*b*, without storing the other blocks.

Then, as illustrated in FIG. 17, in the deduplication, the storage device 200*b* generates correspondence information, and sends the generated correspondence information to the storage device 200*a*. The correspondence information is information that indicates correspondences between the FPs (FP 601*e*1, 601*e*3) of the data (data 600*e*1, 600*e*3) sent from the copy-source storage device 200*a* to the copy-destination storage device 200*b* and the FPs (FP 601*e*11, 601*e*12, 601*e*31, and 601*e*32) of the data (data 600*e*11, 600*e*12, 600*e*31, and 600*e*32) obtained by dividing the data (data 600*e*1, 600*e*3) in the deduplication performed by the storage device 200*b*.

The generation of correspondence information will be described in more detail. Upon receipt of the data 600*e*1 and 600*e*3, additional information, and control information, the storage device 200*b* divides the data 600*e*1 into data 600*e*11 and 600*e*12 of predetermined division size, and also divides the data 600*e*3 into data 600*e*31 and 600*e*32 of predetermined division size. The storage device 200*b* generates FPs for the respective data 600*e*11, 600*e*12, 600*e*31, and 600*e*32. As a result, FPs 601*e*11, 601*e*12, 601*e*31, and 601*e*32 are generated for the data 600*e*11, 600*e*12, 600*e*31, and 600*e*32, respectively. The storage device 200*b* also generates correspondence information that indicates correspondences between FP 601*e*1 of the data 600*e*1 and FPs 601*e*11 and 601*e*12 of the data 600*e*11 and 600*e*12 and also indicates correspondences between FP 601*e*3 of the data 600*e*3 and FPs 601*e*31 and 601*e*32 of the data 600*e*31 and 600*e*32. The correspondence information also includes information indicating a division size used in the deduplication performed by the storage device 200*b*.

In performing the deduplication, the storage device 200*b* divides the acquired data 600*e*1 and 600*e*3 into blocks of predetermined division size, generates FPs for the respective blocks, generates block information indicating each block and its corresponding FP, and stores the block information in the block information memory unit 252*b*. The storage device 200*b* then consults the block information to store only one of blocks having the same FP in the memory device 220*b*, without storing the other blocks. The storage device 200*b* also sends the generated correspondence information to the storage device 200*a*.

More specifically, the storage device 200*b* divides the data 600*e*1 and 600*e*3 into blocks of predetermined division size, and then generates FPs 601*e*11, 601*e*12, 601*e*31, and 601*e*32 for the respective data 600*e*11, 600*e*12, 600*e*31, and 600*e*32 which are divided blocks. Then the storage device 200*b* generates block information indicating the data 600e11, 600e12, 600e31, and 600e32 and the corresponding FPs 601e11, 601e12, 601e31, and 601e32.

At this time, the data 600e12 and 600e31 have the same contents as the data 600e11, so that FPs 601e12 and 601e31 of the respective data 600e12 and 600e31 are the same as FP 601e11 of the data 600e11. Therefore, the storage device 200b consults the block information, and does not store the data 600e12 and 600e31 having the same FP as the data 600e11 in the memory device 220b. The storage device 200b stores the data 600e11 that has the same FP as the data 600e12 and 600e31 and is selected to be stored, and the data 600e32 which has a different FP from the others in the memory device 220b as the data 600f11 and 600f32. Then, the storage device 200b associates the data 600e11 having the same contents as the data stored in the memory device 220b with the corresponding FP 601e11, and the data 600e32 with the corresponding FP 601e32, and stores this generated information in the control information memory unit 254b. The storage device 200b also associates FP 601f11 of the data 600f11 stored in the memory device 220b with the address of the memory area storing the data 600f11, and FP 601f32 with the address of the memory area storing the corresponding data 600f32, and stores this generated information in the address information memory unit 253b. Then, the storage device 200b sends the correspondence information to the storage information 200a over the network 500.

Referring to FIG. 17, example correspondence information indicates a correspondence between FP 601e1 of the data 600e1 and FPs 601e11 and 601e12 of the data 600e11 and 600e12, as well as a correspondence between FP 601e3 of the data 600e3 and FPs 601e31 and 601e32 of the data 600e31 and 600e32. The correspondence information further includes information indicating a division size (for example, 4 KB) used in the deduplication of the storage device 200b. This enables the storage device 200a to recognize the division size used in the deduplication of the storage device 200b.

Upon receipt of the correspondence information from the storage device 200b, the storage device 200a eliminates duplicate blocks of the stored data on the basis of the received correspondence information.

More specifically, upon receipt of the correspondence information, the storage device 200a retrieves the block information on the data 600e stored in the memory device 220a from the block information memory unit 252a. Then, the storage device 200a links FPs of the retrieved block information and FPs of the received correspondence information, and updates the block information in the storage device 200a so as to associate FPs 601e1 and 601e3 of the data 600e1 and 600e3 with FPs 601e11, 601e12, 601e31, and 601e32, as will be described later with reference to FIG. 19. Thereby, the storage device 200a obtains the FPs for the divided blocks of the data 600e1 and 600e3, which were generated through the deduplication of the storage device 200b, without performing the deduplication.

Then, the storage device 200a compares FPs 601e11, 601e12, 601e31, and 601e32 on the basis of the updated block information to extract the same FP. Here, it is assumed that FPs 601e11, 601e12, and 601e31 are the same. Then, on the basis of the updated block information, the storage device 200a identifies blocks having the same FP, eliminates the data 600e11, 600e12, and 600e31 having the same FP except one (for example, data 600e11). Thereby the duplicate blocks out of the data 600e11, 600e12, 600e31, and 600e32 are eliminated. The data 600e11 and 600e32 that are blocks remaining after the elimination of the duplicate blocks from the data 600e1 and 600e3 are taken to as data 600g11 and 600g32, respectively. In addition, FPs for the data 600g11 and 600g32 are taken to as FP 601g11 and FP601g32, respectively.

Then, the storage device 200a updates the address information in the address information memory unit 253a so that FP 601g11 is associated with the address of a memory area storing the corresponding data 600g11, and FP601g32 is associated with the address of a memory area storing the corresponding data 600g32.

Figure 18:
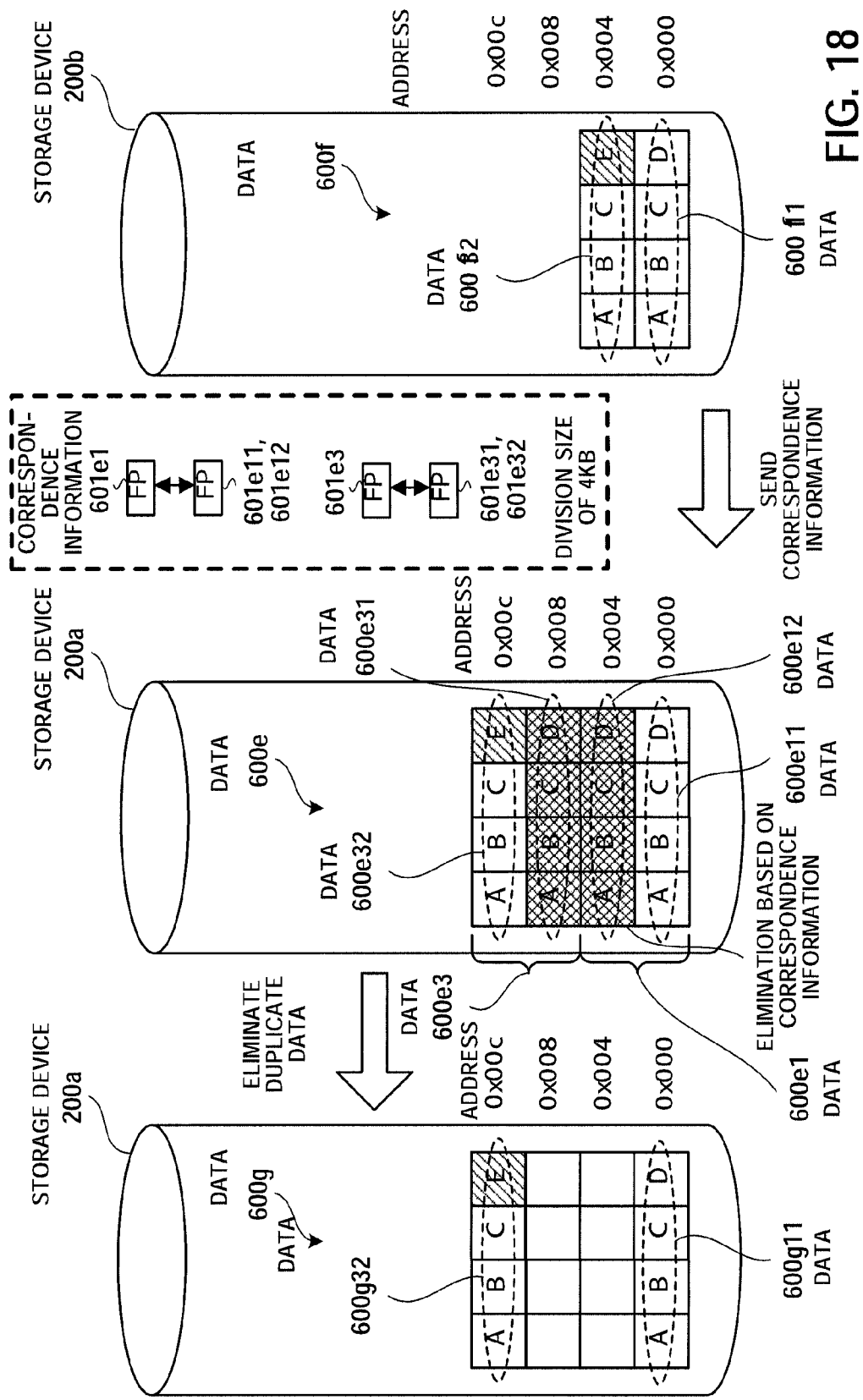
FIG. 18 illustrates how to eliminate duplicate blocks of data according to the third embodiment.

FIG. 18 illustrates how to eliminate duplicate blocks of data according to the third embodiment. As illustrated in FIG. 18, in this embodiment, when the storage device 200b performs further deduplication on data duplicated by the storage device 200a to thereby generate data 600f, the storage device 200b generates and sends correspondence information to the storage device 200a.

In FIG. 18, a plurality of squares in the storage device 200a represents memory areas (hereinafter, considered as memory areas of the storage device 200a) of the memory device 220a of the storage device 200a. Similarly, a plurality of squares in the storage device 200b represents memory areas (hereinafter, considered as memory areas of the storage device 200b) of the memory device 220b of the storage device 200b. In addition, a letter in each square of the storage devices 200a and 200b represents the stored contents of the memory area. Memory areas of the same letter are considered to store the same contents. The data 600f11 has the rightmost square of "D", and the data 600f32 has the rightmost square of "E" indicated by oblique lines. This means that the data 600f11 and the data 600f32 have different contents. On the other hand, blocks having the same letter in their squares are considered to have the same contents, like the data 600e11 and 600e12.

FIG. 18 illustrates in the right part the memory areas which store the data 600f in the storage device 200b after deduplication is performed at the storage device 200b. The storage device 200b stores in its memory areas the data 600f11 at addresses from 0x000 to 0x003, and the data 600f32 at addresses from 0x004 to 0x007.

FIG. 18 illustrates in the center part the memory areas of the storage device 200a before duplicate data is eliminated based on the correspondence information. Before the elimination, the storage device 200a stores in the memory areas the data 600e11 at addresses from 0x000 to 0x003, the data 600e12 at addresses from 0x004 to 0x007, the data 600e31 at addresses from 0x008 to 0x00b, and the data 600e32 at addresses from 0x00c to 0x00f.

The correspondence information indicates correspondences between the data 600e1 and 600e3, which are blocks of the data 600e resulting from the deduplication of the data 600d at the storage device 200a, and the data 600e11, 600e12, 600e31 and 600e32, which are blocks obtained by dividing the data 600e in further deduplication performed by the storage device 200b. FIG. 18 illustrates an example that FP 601e1 of the data 600e1 and FPs 601e11 and 601e12 of the data 600e11 and 600e12 have a correspondence relationship, and FP 601e3 of the data 600e3 and FPs 601e31 and 601e32 of the data 600e31 and 600e32 have a correspondence relationship.

When receiving the correspondence information, the storage device 200a updates the block information stored in the block information memory unit 252a on the basis of the received correspondence information so as to associate the data 600e1 with FPs 601e11 and 601e12 and the data 600e3 with FP 601e31 and 601e32. Then, the storage device 200a eliminates the data 600e12 and 600e31 (in the memory areas indicated by hatching in the storage device 200a illustrated in the center of FIG. 18) which are duplicate blocks of the stored data 600e on the basis of the updated block information.

FIG. 18 illustrates in the left part the memory, areas after the elimination based on the correspondence information is performed on the data 600*e* in the storage device 200*a*. Data obtained after the elimination in the data 600*e* on the basis of the correspondence information (left side of FIG. 18) is taken to as data 600*g*. The elimination based on the correspondence information frees the addresses from 0x004 to 0x00b (blank area of the storage device 200*a* in the left part of FIG. 18) in the storage device 200*a*, where the duplicate data 600*e*12 and 600*e*31 of the data 600*e* have been stored. In addition, together with the elimination of duplicate blocks, the storage device 200*a* updates the address information stored in the address information memory unit 253*b* so that FPs 601*g*11 and 601*g*32 of the data 600*g*11 and 600*g*32 are associated respectively with the addresses of the memory areas storing the data 600*g*11 and 600*g*32 in the memory device 220*a*.

As described above, by acquiring the correspondence information from the storage device 200*b*, the storage device 200*a* produces the same effects in reducing an amount of data as those produced by the storage device 200*b* through the deduplication using a small division size.

Figure 19:
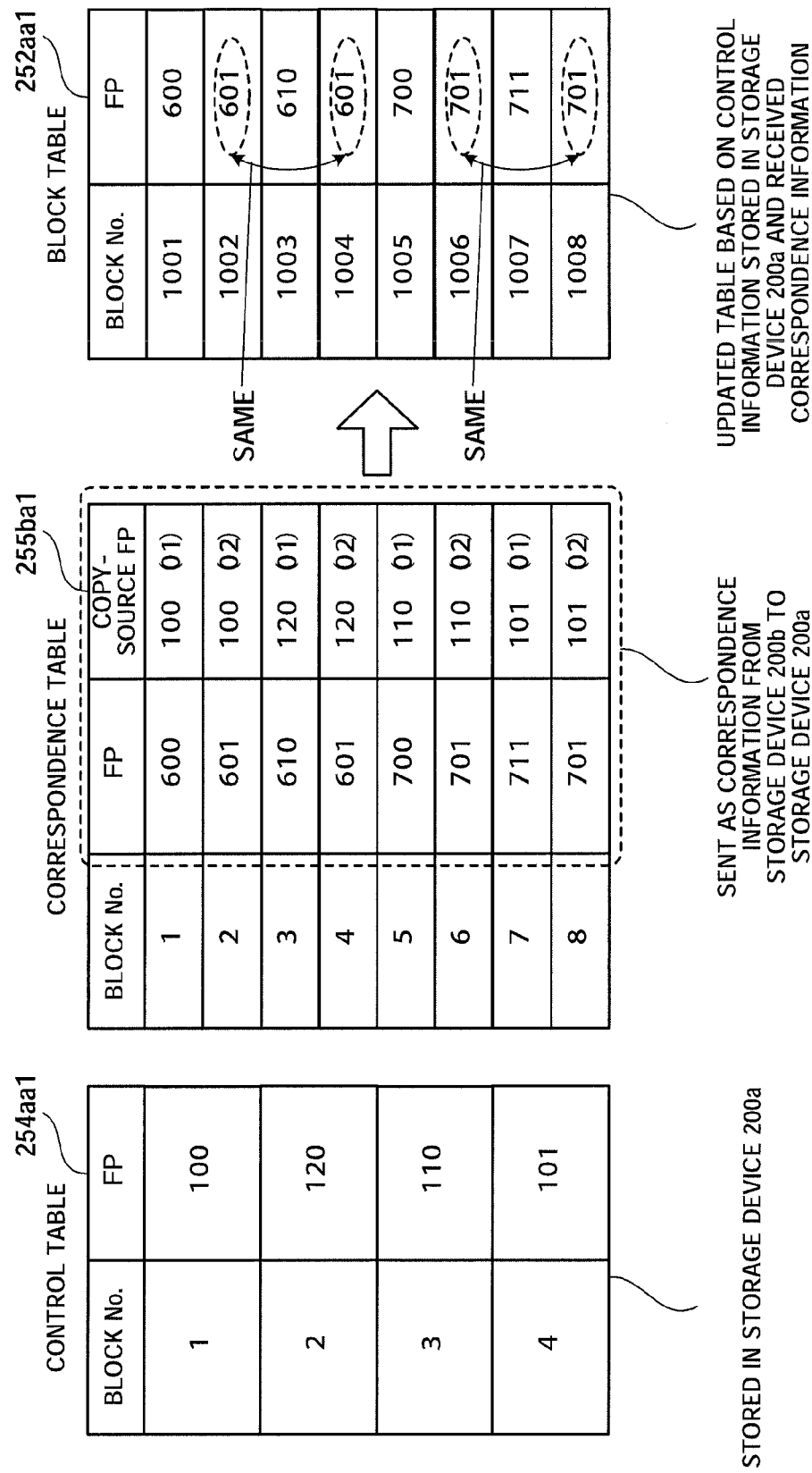
FIG. 19 illustrates how to update block information according to the third embodiment.
Figure 20:
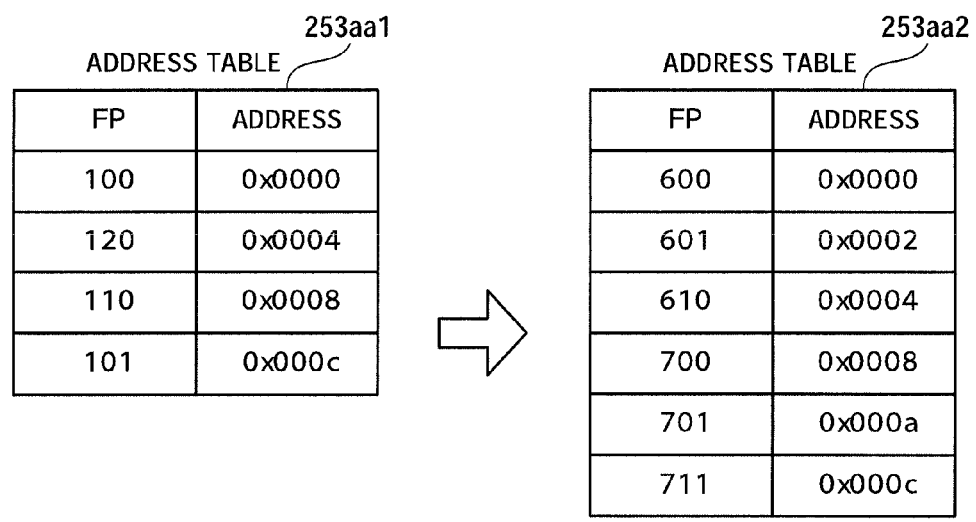
FIG. 20 illustrates how to update address information according to the third embodiment.

FIG. 19 illustrates how to update block information according to the third embodiment. FIG. 20 illustrates how to update address information according to the third embodiment. In this embodiment, after the storage device 200*b* performs deduplication, the storage device 200*a* eliminates duplicate data based on control information stored therein and correspondence information received from the storage device 200*b*, and updates the block information and address information. The following describes how the storage device 200*a* updates block information and address information on the basis of correspondence information, with reference to FIGS. 19 and 20.

The control table 254*aa*1 of FIG. 19 is a table for control information in the storage device 200*a*, which indicates a status after the storage device 200*a* performs deduplication. The correspondence table 255*ba*1 is a table for correspondence information in the storage device 200*b*, which indicates a status after the storage device 200*b* performs deduplication. The block table 252*aa*1 is a table for block information in the storage device 200*a*, which has been updated based on the stored control information and the correspondence information received from the storage device 200*b* after the deduplication was performed at the storage device 200*b*.

The control table 254*aa*1 indicates correspondences between the block Nos. of the blocks (data 600*e*1 and 600*e*3) generated through the deduplication of the data 600*d* at the storage device 200*a* and the FPs of the blocks, as described earlier with reference to FIGS. 16 and 18.

The correspondence table 255*ba*1 indicates correspondences of the block Nos. of the blocks (data 600*e*11, 600*e*12, 600*e*31, and 600*e*32) generated by dividing the data 600*e* in the deduplication performed by the storage device 200*b*, with the FPs of these blocks, and further with "the copy-source FPs", that is, the FPs of the blocks (data 600*e*1 and 600*e*3) of the data 600*e* which has not been deduplicated, as described earlier with reference to FIGS. 16 and 18.

A numeral on the left side of parenthesis in the "copy-source FP" field is an FP of the data 600*e*1, 600*e*3 which is a block of the data 600*e* before the deduplication is performed at the copy-destination storage device 200*b*. A numeral in parenthesis in the copy-source FP indicates what number the data 600*e*11, 600*e*12, 600*e*31, 600*e*32, which is a block generated by dividing the data 600*e*1, 600*e*3 in the deduplication performed by the copy-destination storage device 200*b*, in the blocks obtained by dividing the data 600*e*1, 600*e*3. For example, a copy-source FP of "100 (01)" means that a corresponding block is the first block of the blocks obtained by dividing the data 600*e*1. A copy-source FP of "100 (02)" means that a corresponding block is the second block of the blocks obtained by dividing the data 600*e*1.

According to this embodiment, such correspondence information is sent from the storage device 200*b* to the storage device 200*a* after deduplication is performed at the storage device 200*b*. This correspondence information is generated based on the control information which was received from the storage device 200*a* and is stored in the control information memory unit 254*b* of the storage device 200*b* and the FPs of the divided blocks generated by the storage device 200*b* in the deduplication.

Then, upon receipt of the correspondence information from the storage device 200*b*, the storage device 200*a* stores the received correspondence information in the correspondence information memory unit 255*a*. Then, on the basis of the correspondence information, the storage device 200*a* updates the block information of the storage device 200*a*, like the updating from the block table 252*aa* of FIG. 13 to the block table 252*aa*1.

The following describes how to update the block table 252*aa* in the storage device 200*a* according to this embodiment, with the block No. 1 of the block table 252*aa* as an example. The information generation unit 204*a* of the storage device 200*a* consults the control table 254*aa*1 to determine that the block of No. 1 corresponds to FP 100. The information generation unit 204*a* searches the correspondence information received from the storage device 200*b* based on this determination to detect blocks having the copy-source FP 100, thereby detecting two blocks of Nos. 1 and 2 from the correspondence information. A value in parenthesis of the copy-source FP indicates what number the data is in the divided data generated by the storage device 200*b*.

Then, the information generation unit 204*a* newly sets block Nos. 1001 and 1002 in the block table 252*aa*. The information generation unit 204*a* then sets, for the block Nos. 1001 and 1002, the FPs of the respective blocks of Nos. 1 (FP: 600) and 2 (FP: 601) corresponding to the copy-source FP "100", which were detected from the correspondence information received from the storage device 200*b*, as illustrated in the block table 252*aa*1. New block Nos. are set to have different digit numbers, for example, so as not to overlap with the block Nos. of the blocks existing before duplicate blocks are eliminated. The information generation unit 204*a* repeatedly performs the same process as above on all blocks set before the updating to the block table 252*aa*1, so that the block table 252*aa* which indicates a status immediately after the deduplication is performed at the storage device 200*a* is updated to the block table 252*aa*1.

The storage device 200*a* consults the updated block table 252*aa*1 to extract blocks having the same FP, and eliminates duplicate blocks from the memory device 220*a*.

The address table 253*aa*1 of FIG. 20 is a table for address information in the storage device 200*a* after deduplication is performed at the storage device 200*a*. The address table 253*aa*2 is a table for address information in the storage device 200*a*, which has been updated after duplicate blocks of data are eliminated based on correspondence information received from the storage device 200*b* which performed deduplication.

In this embodiment, after deduplication is performed at the storage device 200*b*, correspondence information is sent from the storage device 200*b* to the storage device 200*a*.

Then, upon receipt of the correspondence information from the storage device 200*b*, the storage device 200*a* eliminates duplicate blocks stored in the memory device 220*a* based on the correspondence information, and updates the address information according to the changes of the blocks in the memory areas and FPs due to the elimination, like the updating from the address table 253aa1 to the address table 253aa2.

The following describes how to update the address table 253aa1. In the storage device 200a, after the deduplication unit 203a eliminates duplicate blocks of the data 600e on the basis of the correspondence information, the information generation unit 204a deletes the FPs of the blocks of the data 600e corresponding to the eliminated blocks and the addresses of the memory areas storing the blocks of the data 600e. Then, the storage device 220a sets the addresses of the memory areas storing the blocks remaining after the elimination, and the FPs of the blocks. By the information generation unit 204 repeating the same process as above on all blocks which were set in the address table 253aa1, the address table 253aa1 of the storage device 200a is updated to the address table 253aa2.

Figure 21:
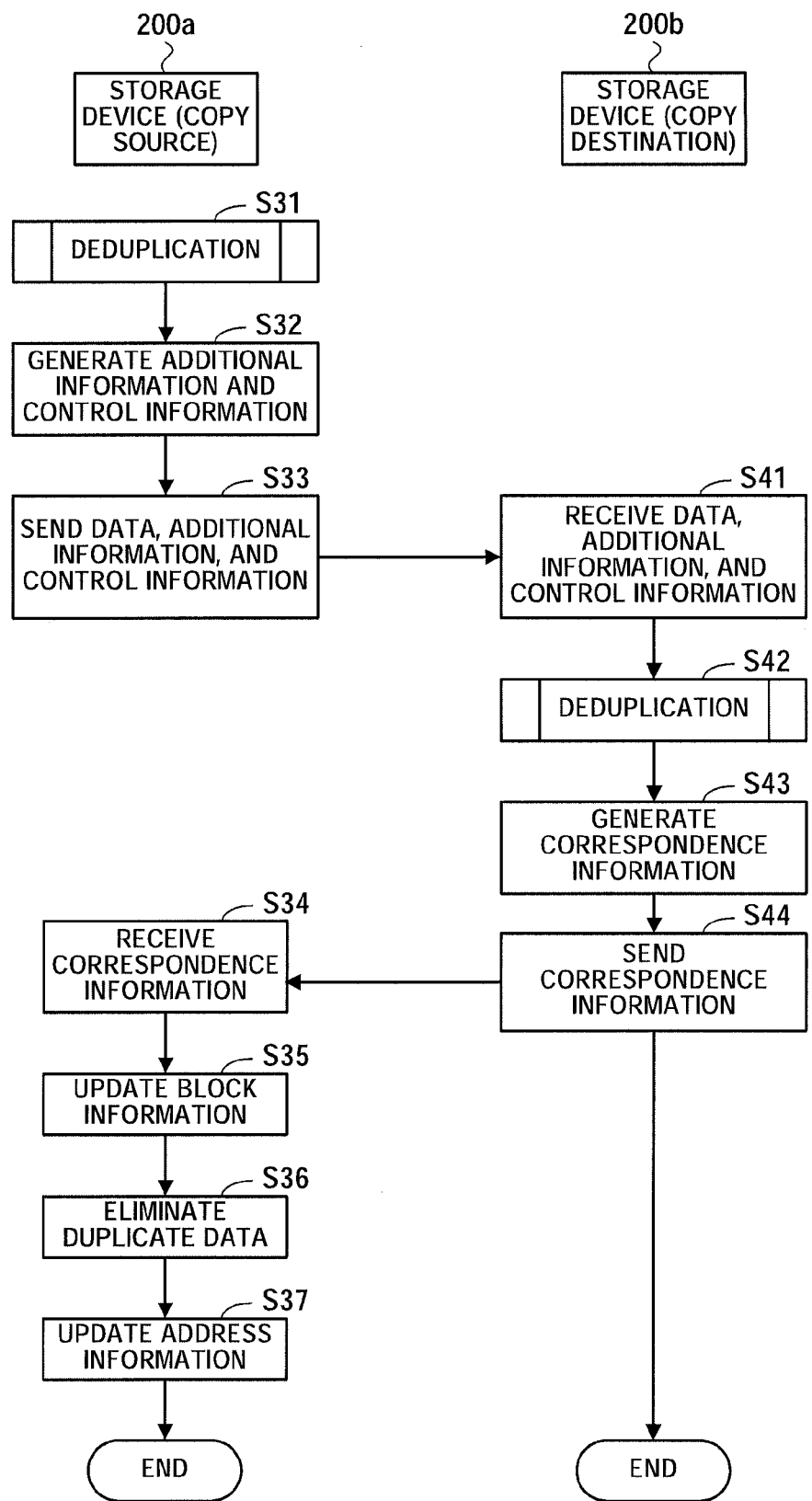
FIG. 21 is a sequence diagram describing a process to be performed in storage devices according to the third embodiment.

FIG. 21 is a sequence diagram of a process to be performed in storage devices according to the third embodiment. The following describes how the storage device 200a serving as a copy source of data to be backed up and the storage device 200b serving as a copy destination of the data perform deduplication. This process will be described step by step.

(Step S31) The storage device 200a performs deduplication (FIGS. 9 and 10) on data to be backed up.

(Step S32) The storage device 200a generates additional information and control information on the basis of the result of the deduplication of step S31.

(Step S33) The storage device 200a sends the storage device 200b the data resulting from the deduplication of step S31, and the additional information and control information generated at step S32.

(Step S41) The storage device 200b receives the data, additional information, and control information which were sent from the storage device 200a at step S33.

(Step S42) The storage device 200b performs deduplication on the data received at step S41, on the basis of the additional information received at step S41.

(Step S43) The storage device 200b generates correspondence information on the basis of the result of the deduplication of step S42. The correspondence information includes control information on data resulting from the deduplication performed by the storage device 200b.

(Step S44) The storage device 200b sends the correspondence information generated at step S43 to the storage device 200a.

(Step S34) The storage device 200a receives the correspondence information which was sent from the storage device 200b at step S44.

(Step S35) The storage device 200a updates the block information on the basis of the correspondence information received at step S34.

(Step S36) The storage device 200a eliminates duplicate blocks of the data deduplicated at step S31, on the basis of the block information updated at step S35.

(Step S37) The storage device 200a updates the address information on the basis of the result of the elimination of step S36. Then, the storage devices 200a and 200b complete this process.

As described above, in addition to the second embodiment, the storage devices 200a and 200b according to the third embodiment enhance effects of deduplication in the case where backup data is duplicated in such a way that the storage device 200b stores the backup data deduplicated by the storage device 200a, by replicating and mirroring the backup data.

That is to say, to duplicate backup data, the deduplication unit 203a of the copy-source storage device 200a which performed deduplication sends the copy-destination storage device 200b additional information including a division size used in the deduplication. The deduplication unit 203b of the copy-destination storage device 200b divides data by a smaller division size than that indicated in the received additional information, and performs the deduplication. This makes it possible to perform the deduplication efficiently by performing the deduplication in a distributed manner at the storage devices 200a and 200b. In addition, it also makes it possible to further reduce an amount of data through the deduplication while preventing loads from concentrating on a storage device 200a, 200b.

In addition, the deduplication unit 203a reflects, in the memory device 220a, the result of the deduplication performed by the storage device 200b on the basis of the correspondence information, thereby making it possible to reduce an amount of data stored in the memory device 220a without performing the deduplication.

The processing functions described above can be realized by a general computer. In this case, a program is prepared, which describes processes for the functions to be performed. The program is executed by a computer, whereupon the aforementioned processing functions are accomplished by the computer. The program describing the processes may be recorded on a computer-readable recording medium. Computer-readable recording media include magnetic recording devices, optical discs, magneto-optical recording media, semiconductor memories, etc. The magnetic recording devices include hard disk drives, Flexible Disks (FD), magnetic tapes (MT), etc. The optical discs include DVDs (Digital Versatile Discs), DVD-RAMs, CD-ROMs (Compact Disc-Read Only Memory), CD-R (Recordable)/RW (ReWritable), etc. The magneto-optical recording media include MOs (Magneto-Optical disk) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

The proposed storage device makes it possible to further reduce an amount of data through deduplication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage device for performing deduplication by comparing divided data, comprising:
an information memory unit;
a data memory unit;
a data acquisition unit that acquires second data obtained by deduplicating first data at another device, from said another device;
an information acquisition unit that acquires first information from said another device and stores the first information in the information memory unit, the first information including first additional information indicating a first division size used for dividing the first data in the deduplication of said another device; and
a deduplication unit that divides the acquired second data by a second division size smaller than the first division size indicated in the first additional information included in the stored first information, performs the deduplication on the divided second data to obtain third data, and stores the third data in the data memory unit.

2. The storage device according to claim 1, further comprising:
an information generation unit that generates second information including second additional information indicating the second division size used by the deduplication unit for dividing the second data;
an information output unit that sends the generated second information to another device via a communication circuit; and
a data output unit that outputs the third data via the communication circuit to said another device.

3. The storage device according to claim 2, wherein:
the information acquisition unit acquires, from said another device, information on the third data, which includes correspondence information indicating correspondences between divided blocks of the third data before the deduplication of said another device and data obtained in the deduplication of said another device, and stores the acquired information in the information memory unit; and
the deduplication unit eliminates blocks which has been eliminated through the deduplication of said another device, out of the third data from the data memory unit on the basis of the correspondences indicated by the correspondence information included in the information stored in the information memory unit.

4. The storage device according to claim 1, further comprising:
an information generation unit that generates second information including correspondence information indicating correspondences between divided blocks of the second data before the deduplication of the deduplication unit and the third data; and
an information output unit that sends the generated second information to another device via a communication circuit.

5. The storage device according to claim 1, wherein:
the first additional information indicates whether the acquired second data has been deduplicated by said another device or not; and
the deduplication unit does not perform the deduplication on the second data when the first additional information indicates that the second data has been deduplicated by said another device.

6. The storage device according to claim 1, wherein:
the first additional information indicates whether deduplication is executable on the acquired second data; and
the deduplication unit does not perform the deduplication on the second data when the first additional information indicates that the deduplication is not executable on the second data.

7. The storage device according to claim 1, wherein:
the deduplication unit compresses the third data, and stores the compressed third data in the data memory unit.

8. The storage device according to claim 7, wherein:
the first additional information indicates whether compression is executable on the acquired second data; and
the deduplication unit does not compress the third data when the first additional information indicates that the compression is not executable on the second data.

9. The storage device according to claim 7, wherein:
the first additional information indicates a data format of the acquired second data; and
the deduplication unit does not compress the third data when the first additional information indicates that the data format of the second data is an incompressible format.

10. The storage device according to claim 1, wherein:
the deduplication unit performs the deduplication on the second data by dividing the second data into blocks, generating identification information identifying each of the blocks, and deleting blocks of same identification information except one block.

11. The storage device according to claim 1, wherein:
said another device is a backup management server which is capable of performing the deduplication; and
the first additional information indicates the first division size used for dividing the first data in the deduplication of the backup management server.

12. The storage device according to claim 1, wherein:
said another device is another storage device; and
the first additional information indicates the first division size used for dividing the first data in the deduplication of said another storage device.

13. A computer-readable, non-transitory medium storing a storage device control program implemented by a computer for controlling a storage device that performs deduplication by comparing divided data, the storage device control program comprising:
causing a data acquisition unit to acquire data;
causing an information acquisition unit to acquire and store, in an information memory unit, information including additional information indicating a division size used for dividing data in deduplication of another device
causing a deduplication unit to divide the data acquired by the data acquisition unit, by a smaller division size than the division size indicated in the additional information included in the information stored in the information memory unit, perform the deduplication, and store data resulting from the deduplication in a data memory unit.

14. A method implemented by a computer for controlling a storage device that performs deduplication by comparing divided data, the method comprising:
causing a data acquisition unit to acquire data;
causing an information acquisition unit to acquire and store, in an information memory unit, information including additional information indicating a division size used for dividing data in deduplication of another device; and
causing a deduplication unit to divide the data acquired by the data acquisition unit, by a smaller division size than the division size indicated in the additional information included in the information stored in the information memory unit, perform the deduplication, and store data resulting from the deduplication in a data memory unit.

* * * * *